United States Patent
Shakouri et al.

(10) Patent No.: US 7,173,245 B2
(45) Date of Patent: Feb. 6, 2007

(54) SUBMICRON THERMAL IMAGING METHOD AND ENHANCED RESOLUTION (SUPER-RESOLVED) AC-COUPLED IMAGING FOR THERMAL INSPECTION OF INTEGRATED CIRCUITS

(75) Inventors: Ali Shakouri, Santa Cruz, CA (US); Peyman Milanfar, Menlo Park, CA (US); Kenneth Pedrotti, Soquel, CA (US); James Christofferson, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 732 days.

(21) Appl. No.: 10/039,290

(22) Filed: Jan. 4, 2002

(65) Prior Publication Data

US 2002/0126732 A1    Sep. 12, 2002

Related U.S. Application Data

(60) Provisional application No. 60/327,209, filed on Oct. 2, 2001, provisional application No. 60/260,288, filed on Jan. 4, 2001.

(51) Int. Cl.
   *G01J 5/02* (2006.01)
(52) U.S. Cl. .............................. 250/339.11; 250/339.1
(58) Field of Classification Search ............. 250/339.1, 250/339.11
   See application file for complete search history.

(56) References Cited

U.S. PATENT DOCUMENTS 5,199,054 A * 3/1993 Adams et al. ................ 378/21
5,751,830 A * 5/1998 Hutchinson ................. 382/103
6,166,384 A * 12/2000 Dentinger et al. ..... 250/370.09
6,175,713 B1 * 1/2001 Uehara et al. .............. 399/307
6,288,381 B1 * 9/2001 Messina .................. 250/201.1

FOREIGN PATENT DOCUMENTS

JP       2000121585 A    *   4/2000

OTHER PUBLICATIONS

Helium Neon Laser, Wikipedia, pp. 1-2.*
Batista, J. et al.; "Subsurface Microscopy of Biased Metal-Oxide-Semiconductor Field Effect Transistor Structures: Phtothermal and Elctroreflectance Images," Sensors and Actuators, A71, pp. 40 thru 45, (1998).

(Continued)

*Primary Examiner*—Otilia Gabor
*Assistant Examiner*—Christine Sung
(74) *Attorney, Agent, or Firm*—John P. O'Banion

(57) ABSTRACT

Methods and apparatus for non-contact thermal measurement which are capable of providing sub micron surface thermal characterization of samples, such as active semiconductor devices. The method obtains thermal image information by reflecting a light from a surface of a device in synchronous with the modulation of the thermal excitation and then acquiring and processing an AC-coupled thermoreflective image. The method may be utilized for making measurements using different positioning techniques, such as point measurements, surface scanning, two-dimensional imaging, and combinations thereof. A superresolution method is also described for increasing the resultant image resolution, based on multiple images with fractional pixel offsets, without the need to increase the resolution of the image detectors being utilized. The thermoreflective method provides a spatial resolution better than current infrared cameras, operates within a wide temperature range, and is capable of a thermal resolution on the order of 10 mK°.

47 Claims, 15 Drawing Sheets

OTHER PUBLICATIONS

Claeys, W. et al.; "Thermoreflectance Optical Test Probe for the Measurement of Current Inducted Temperature Changes in Microelectric Components," Quality and Reliability Engineering Internationak, vol. 9, pp. 303-308, (1993).

Csendes, A. et al.; "Thermal Mapping With Liquid Crystal Method," Microelectronic Engineering, col. 31, pp. 281-290, (1996).

Cutolo, Antonello; "Selected Contactless Optoelectronic Measuremetns for Electronic Applications (Invited)," Review of Scientific Instruments, vol. 69, No. 2; pp. 337-360, Feb. 1998.

Garfinkel, J. et al.; "Piezoreflectivity of the Noble Metals," Physical Review, vol. 115, No. 1; pp. 695-706, Aug. 1966.

Goodson, K.E. and Ju, Y.S.; "Short-Time-Scale Thermal Mapping of Microdevices Using a Scanning Theroreflectance Technique," Transactions of the ASME, vol. 120, pp. 306-313, May 1998.

Grauby, S. et al.; "High Resolution Photothermal Imaging of High Frequency Phenomena Using a Visible Charge Coupled Device Camera Associated With a Multichannel Lock-In Scheme," Review of Scientific Instruments, vol. 70, No. 9, pp. 3603 thru 3608, Sep. 1999.

Herman, I. P.; "Real-Time Optical Thermimetry During Semiconductor Processing," IEEE Journal of Selected Topics in Quantum Electronics, vol. 1, No. 4, pp. 1047-1053, Dec. 1995.

Ju, S., Kading, O. et al.; "Short-Timescale Thermal Mapping of Semiconductor Devices," IEEE Electron Device Letters, vol. 18, No. 5, pp. 169-171, May 1997.

Kolzer, J. et al.; "Thermal Imaging and Measurement of Techniques for Electronic Materials and Devices," MIcroelectronic Engineering, vol. 31, pp. 251-270, (1996).

Kondo, Seiichi et al.; "High Resolution Temperature Measurement of Void Dynamics Induced by Electromigration in Aluminum Metallization," Applied Physics Letters, vol. 67, no. 11, pp. 1606-1608, Sep. 1995.

Langer, G. et al.; "Thermal Conductivity of Thin Metallic Films Measured by Photothermal Profile Analysis," Review of Scientific Instruments, vol. 68, No. 3, pp. 1510-1513, Mar. 1997.

Lee, A.S. and Norris, P.M.; "A New Optical Method for Measuring Surface Temperature at Large Incident Probe Angles," Review of Scientific Instruments, vol. 68, No. 2, pp. 1307-1311, Feb. 1997.

Litvinenko, S. et al.; "Application of Dynamical Optical Reflection Thermography(DORT) for Detecting of Dark Current Inhomogeneity in Semiconductor Devices," Applied Surface Science, vol. 137, pp. 45-49, (1999).

Mansanares, A. et al.; "Temperature Measurements of Telecommunication Lasers on a Micrometre Scale," Electronics Letters, vol. 29, No. 23, pp. 2045-2047, (1993).

Phan, T.; "Thermoreflectance Measurements of Transient Temperature Upon Integrated Circuits: Application to Thermal Conductivity Identification," Microelectronics Journal, vol. 29, pp. 181-190, (1998).

Quintard, V. et al.; "Temperature Measurement of Metal Lines Under Current Stress by High-Resolution Laser Probing," IEEE Transactions on Instrumetnation and Measurement, vol. 48, No. 1, pp. 69-74, Feb. 1999.

Willenborg, A. et al.; "Detection of Thermal Waves Through Optical Reflectance," Applied Physics Letters, vol. 46, No. 11, pp. 1013-1015, Jun. 1985.

Spirig, T.; The Lock in CCD-Two Dimensional Synchronous Detection of Light, IEEE Journal of Quantum Electronics, vol. 31, No. 9, pp. 1705-1708, Sep. 1995.

Vertikov, M. et al.; "Time Resolved Pump-Probe Experiments With Subwavelength Lateral Resolution," Applied Physics Letters, vol. 69, No. 21, pp. 2465-2467, Oct. 1996.

Elad, Michael and Feuer, Arie; "Restoration of a Single Superresolution Image From Several Blurred, Noisy, and Undersampled Measured Images," IEEE Transactions on Image Processing, vol. 6, No. 12, pp. 1646-1658, Dec. 1997.

Hardie, Russell C., Barnard, Kenneth J., and Armstrong, Ernest E.; "Joint Map Registration and High-Resolution Image Estimation Using a Sequence of Undersampled Images," IEEE Transactions on Image Processing, vol. 6, No. 12, pp. 1621-1633, Dec. 1997.

Nguyen, Nhat, Milanfar, Peyman, Golub, G.; "A Computationally Efficient Superresolution Image Reconstruction Algorithm," IEEE Transactions on Image Processing, vol. 10, No. 4, pp. 573-583, Apr. 2001.

Schultz, Richard R. and Stevenson, Robert L.; "Extraction of High-Resolution Frames From Video Sequences," IEEE Transactions on Image Processing, vol. 5, No. 6, pp. 996-1011, Jun. 1996.

Irani, Michal and Peleg, Shmuel; "Super Resolution From Image Sequences," Proceedings, 10th International Conference on Pattern Recognition, vol. 2, pp. 115-120, Jun. 1990.

* cited by examiner

SUBMICRON THERMAL IMAGING METHOD AND ENHANCED RESOLUTION (SUPER-RESOLVED) AC-COUPLED IMAGING FOR THERMAL INSPECTION OF INTEGRATED CIRCUITS

CROSS-REFERENCE TO RELATED APPLICATIONS

This application claims priority from U.S. provisional application Ser. No. 60/260,288 filed on Jan. 4, 2001, incorporated herein by reference. This application also claims priority from U.S. provisional application Ser. No. 60/327,209 filed on Oct. 2, 2001, incorporated herein by reference.

STATEMENT REGARDING FEDERALLY SPONSORED RESEARCH OR DEVELOPMENT

This invention was made with Government support under Grant No. CCR-9984246 awarded by the National Science Foundation and Grant No. DAAD19-99-1-0158 awarded by the Department of the Army. The Government has certain rights in this invention.

REFERENCE TO A COMPUTER PROGRAM APPENDIX

Not Applicable

BACKGROUND OF THE INVENTION

1. Field of the Invention

This invention pertains generally to non-contact thermal registration methods, and more particularly to high resolution and super-resolution non-contact optical methods for providing thermal sub micron characterization of active semiconductor devices.

2. Description of the Background Art

Advances are continually being made in semiconductor fabrication techniques that allow manufacturing smaller and faster semiconductor devices. It will be appreciated that these fast-switching devices also can generate an increasing amount of heat per unit area. Effective thermal management, therefore, is essential to achieve reliable operation of these semiconductor devices in the face of continuing advancement, and the characterization of thermal effects on the scale of these devices is becoming increasing important. It will be appreciated that achieving temperature measurements on increasingly smaller device geometries is non-trivial, particularly at spatial resolutions at or below one micron. Although a number of methods exist to measure the temperature on such a small scale, all current methods suffer from one or more shortcomings, such as lack of accuracy, measurement speed, the required sophistication of the experimental setup, and complexity of the required data analysis.

One application for thermal imaging is in relation to the use of Heterostructure Integrated Thermionic (HIT) coolers. By way of example, and not of limitation, this application will be described in relation to the current methods of thermal imaging so that the current methods may be more readily understood. Thermal management of small, hot semiconductor devices is often accomplished with the use of HIT micro coolers. These micro coolers can be integrated with other types of semiconductor devices to provide localized cooling. For example, an integrated HIT cooler with a semiconductor laser would provide for active temperature control to stabilize the wavelength of the laser, and thus improve reliability of wavelength division multiplexing (WDM) networks. In developing HIT coolers, it is important to experimentally gather measurements of cooling profiles for different device structures and geometries, such as for HIT micro coolers ranging in size from 10 µm to 100 µm. Currently, theoretical predictions for the cooler are higher than the performance measured so there is a need to identify and eliminate non-ideal effects.

Cooling as a function of the applied current to the cooler can be represented by the following quadratic equation:

$$\text{Cooling} = \alpha I - \beta I^2$$

wherein a linear Peltier term $\alpha I$ is followed by a Joule heating term $\beta I^2$, with alpha ($\alpha$) and beta ($\beta$) being based on device parameters. Previous experimental measurements of HIT device cooling were achieved in the lab by using a micro thermocouple in contact with the device. The smallest conventional thermocouples with high accuracy that are available are approximately 50 µm in diameter. Using a microscope, the thermocouple was placed in contact with the device, the temperature was measured, and the output was monitored by a computer. Some typical room temperature results are shown in FIG. 1 along with the quadratic fit. The HIT coolers are shown to provide a maximum cooling of about one degree at about 180 mA.

Use of a thermocouple has a number of drawbacks which are primary result of its significant size in relation to the device under test, which in this case is a HIT cooler, such as in the 10 µm to 100 µm size range. Thermally coupled with the HIT cooler, or alternative circuits under test, the thermocouple represents a huge thermal load, and the heat required to warm up the thermocouple should be considered, as well as general heat losses or gains which may be conducted via the thermocouple to or from the device being tested. This thermal mass, generally being larger than the device itself, also extends the necessary measurement time scale as a consequence of thermocouple response time. Furthermore, the thermocouples require the careful use of thermal pastes and are susceptible to breakage. It will be appreciated, therefore, that a need exists to improve the method of thermal characterization.

There are various known methods of performing non-contact temperature measurements that possibly could be applied to the testing of HIT coolers, although such testing requires spatial resolution on the order of one micron and a thermal resolution which can preferably approach 0.1° K. It will be appreciated that a number of material properties are dependent on temperature that may be exploited for performing local temperature measurements.

For example, in liquid crystal thermography (LCT), a thin layer of liquid crystal is deposited onto a device under test. Traditionally the LCT method has used cholesteric crystals where the local color of the film is related to the temperature. An improved method uses the nematic-isotropic phase transition giving a spatial resolution of two microns and thermal resolution of 0.1° K. The phase transition causes a dark spot to be seen under a polarizing microscope. Since the phase transition only occurs at one temperature for a certain liquid crystal, the temperature registration only provides relative temperature measurement within a narrow temperature range. The stage temperature is set relative to the transition temperature, subsequent to which the surface temperature can be determined. Thus to generate a series of isothermal lines, the experiment must be repeated many times at differing stage temperatures.

Fluorescence microthermography utilizes a thin film of europium thenoyl-triuoroacetonate (EuTTA), having a florescence line at 612 nm, that is deposited on the surface of the sample and which is subsequently illuminated with UV light. Within a gap from 500 nm to 612 nm, there is no absorption and no fluorescence occur, and the quantum efficiency is therein a function of temperature. Thus, by measuring the intensity of the reflected light, and by applying an inverse transformation function, the surface temperature of the device can be deduced. Moderate complexity image processing is required to recover the relative temperature map.

Both fluorescence microthermography and liquid crystal thermography use the thermal properties of a well known substance that is deposited on top of the device, which should result in well calibrated results. However, the temperature of the layer is what is actually being measured, and the non-zero thermal resistance and the heat capacity of the deposited layer must also be considered. In addition, accuracy depends on considerations of layer thickness and possible non-uniformities.

Optical interferometry measures the thermal expansion of the material. This method looks at interference between a reference and reflected beam. The path difference of the rays can be measured very accurately by the interference pattern. The spatial resolution is limited by the size of the laser spot of the interferometer.

Polarization difference reflectometry utilizes a modulated incident beam with P and S polarization components that have different reflectivity components. By modulating the polarization of a laser probe, then taking the difference, the temperature of the sample can be determined from registering non-normal angles of reflection. This method requires active excitation of the sample, and as a result of the difference signal reaching a maximum at 88 degrees, wherein probe beam size must be considered.

Near field optical microscopy (NSOM) requires the fabrication of a fiber optic probe with an aperture of about 50 nm, such as may be created by stretching a fiber, coating the end in metal, and then etching to the desired profile. The probe is then placed close enough to the surface of the device and the near field can be transmitted through the fiber-optic, subject to a level of intrinsic loss. For a small aperture, the wave function of electromagnetic radiation is a decaying exponential; however, if the wave is not subject to excessive loss it will be transmitted down the probe. The technique is capable of providing spatial resolution which is higher than the diffraction limit of the radiation from the surface. The probe may be utilized to implement a number of measurement methods and is described in the literature for performing standard blackbody measurements, and for performing thermoreflectance probing. A few of the complications involved with the method are issues relating to the construction of the fiber optic probe, and its placement in sufficient proximity to the surface of the device to measure the near field. The probe should be positioned roughly half of the aperture size from the surface, to allow for near field detection. Typically, this requirement can be met by positioning the probe within 25 nm of the surface; however, any sudden contact with the surface can easily destroy the probe.

Infrared thermography makes use of the fact that objects or materials held at a temperature above absolute zero emit a level of infrared radiation. One class of objects, referred to as blackbodies, have an infrared radiation distribution which is well known. Classical infrared thermography utilizes Plank's blackbody law to determine the temperature of the object surface. By measuring the radiation intensity at a specific wavelength and making the blackbody assumption, the absolute temperature can be measured. The spatial resolution of the infrared image is determined by the diffraction limit. In reality, however, few objects can be considered "blackbodies" and Plank's law needs to be scaled for each object by a factor called the emissivity. The generation of accurate thermal images, therefore, requires a knowledge of the emissivity for each element within the image, which consequently complicates temperature calibration of the associated infrared camera images. Presently, high sensitive IR cameras operate at about a 3 µm wavelength.

In collaboration with Oak Ridge National Labs, an IR camera was utilized to measure the cooling on a 180×90 micron cooler. It was found, however, that even from a camera costing over one hundred thousand dollars, the image was not useful even on the largest coolers. The heat from the current probe was found to dominate the image and mask any effects of cooling at the surface. Furthermore the image was not normalized so as provide temperature profiling.

Thermoreflectance measurements have been utilized for registering low-resolution thermal profiles of devices. It will be recognized that the reflectance coefficient of a surface has a small linear dependence on temperature, wherein the change in reflection per unit temperature is called the thermoreflectance constant and is denoted by $C_{th}$. Thermal excitation of the surface may be provided by a heating laser, and the phase difference between the excitation pulse and the probe can be used to determine the thermal wave propagation velocity of the solid, or the thermal resistance of a material, at the surface. The semiconductor device itself has also been utilized as the excitation source and the thermal change in the sample can thereafter be determined. Researchers have experimented with metal interconnects which excite a metal trace with a current pulse and register the change in reflection. The reflection changes are calibrated with thermistor measurements. Other researchers have experimented with measuring thermoreflectance when heating a 35 micron MOS transistor, and temperatures in semiconductor lasers. However, in all these instances the small thermoreflectance coefficient results in the generation of a measurement having a low signal-to-noise ratio, and the technique is unable to provide absolute measurements. These direct thermoreflectance measurements are capable of providing a resolution on the order of $10°$ K.

Therefore, it will be appreciated current methods for performing thermal measurements on small circuits and devices are difficult to construct and calibrate, while they often provide insufficient spatial and thermal resolution. The present invention overcomes those deficiencies.

BRIEF SUMMARY OF THE INVENTION

The present invention includes an AC-coupled thermoreflectance method for performing simple and inexpensive temperature measurements of samples having a known surface material composition that can provide spatial resolution at better than one micron, and thermal resolution to about $10°$ mK or better. The method is particularly well-suited for use on small geometry active devices (micron and sub micron regimes), such as integrated circuits, MEMs devices, HIT devices, and other small scale active devices whose thermal activity may be modulated, and for which thermal profiles need to be accurately profiled, or imaged. To obtain high spatial resolution the present the thermoreflectance method of the present invention preferably utilizes two dimensional optical detector arrays, such as CMOS detector arrays, or PIN-array detectors, which are coupled with parallel processing of the image data. It will be appreciated that a detector array is not subject to the non-repeatability of mechanical positioning which is characteristic of point, and point scanning thermal measurements.

The invention also includes a method for extending the spatial resolution of acquired thermal measurements from multiple images. The method of the present invention is capable of providing thermal resolution measurements down to approximately 10° mK.

It will be appreciated that the reflection coefficient of a material has a small linear dependence on temperature. Accordingly, thermoreflective images according to the present invention are obtained by reflecting a source of illumination, such as a laser, from the surface of the material of a sample under test and registering the amount of reflected light within an optical detector, such as a photodiode array. By way of example, and not of limitation, the light source preferably comprises a laser operating within a wavelength range of approximately 200 nm to 1000 nm. The optimum operating power of the laser is dependent on the method of scanning, the resolution requirements, and the thermal characteristics of the sample under test. Generally a laser power level ranging from approximately 1 mW to 100 mW will be sufficient for most applications. In view of the fact that the computation of temperature based on reflectance from DC measurements is subject to noise levels which prevent the registration of accurate temperature readings, the present invention utilizes an AC measurement technique which eliminates the DC component of noise. The thermal excitation of the active device, such as the operating current or state, is modulated according to a known frequency, such as within the range between 0.1 Hz and 100 kHz. It is expected that an optimum excitation frequency for many devices will be found in the range from between 100Hz to 1000 Hz. A light, such as a laser is reflected from the surface of the sample whose reflection is registered by an AC-coupled imaging detector having a very narrow passband which is equal to, or associated with, the excitation frequency. Filtering, such as heterodyne filtering, may be utilized to detect the small changes in thermoreflectivity.

The use of the AC coupling in the method of the invention increases the effective signal-to-noise ratio. Registration of the small thermoreflectance signal is preferably accomplished within the present invention by utilizing differential box-car filtering, lock-in amplification, FFT analysis, and other differencing and/or very narrow band signal filtering techniques. A thermoreflectance microscope built according to the invention can provide thermal images of micron and sub micron regions and high thermal sensitivities extending to about 10° mK and the technique may be utilized down to cryogenic temperatures.

This resultant thermoreflectance microscope according to the present invention can generate quantitative, real time thermal images with a higher spatial resolution than any commercially available infrared microscope. To obtain quantitative measurements, signal processing must be performed on the data, but this is not much more complicated than what is currently required for infrared imaging and still allows for a "real-time" image. Also, the resultant thermoreflectance microscope can be utilized at very low temperatures where insufficient blackbody signal exists for use by infrared cameras. For example, thermoreflectance imaging may be the only viable non-contact method to measure the temperature on an active semiconductor in a cryostat. It will be appreciated that a number of advantages are provided by the use of a thermoreflectance microscope according to the present invention.

Another aspect of the invention is a method and apparatus for further enhancing the resolution of thermoreflective imaging. This method uses multiple images of the device together with a technique for combining the images using an interpolation routine executing on a processor, or other processing element capable of manipulating image data, to obtain spatial resolution beyond that given directly by the imaging system hardware. In effect, the invention produces high resolution images from a lower resolution camera by intelligently collecting and combining multiple images gathered by carefully controlled relative motion between the device and the camera. The method will allow measurement of image details with unprecedented resolution up to approximately 0.2 μm, and perhaps reaching increased spatial resolution at or below 0.1 μm under favorable conditions. Although techniques have existed for enhancing resolution from multiple frames, the use of superresolution imaging for these AC-coupled imagers in combination with implementation of the present techniques, and the scanning and imaging apparatus, is inventive and provides significant benefits. The technique can be applied to applications such as thermal imaging of small circuits and devices which can achieve sub-micron spatial resolution and 10° mK to 50° mK temperature resolution.

It will be seen that the apparatus and methods of the invention provide for non-contact thermal measurements of active devices at high spatial and thermal resolutions. The elements of the basic apparatus generally comprise: (1) an illumination source whose generated beam of light may be directed to reflect from the surface of a sample under test; (2) an illumination detector adapted for generating a signal in response to the intensity of light received from the illumination source which has been reflected from the surface of the sample; and (3) a means of registering the AC-component of the registered light amplitude reflected from the surface of a sample subject to modulated thermal excitation, upon which computations of thermal measurements are performed based on the change in registered surface reflectance, as determined by the thermoreflectance coefficient of the surface material of the sample, in response to temperature changes associated with the level of thermal excitation.

An object of the invention is to provide thermal imaging of small circuits and devices.

Another object of the invention is to provide an achievable thermal resolution on the order of 10° mK .

Another object of the invention is to provide spatial resolution below one micron.

Another object of the invention is to provide a method of thermal registration of a surface that may be utilized with imaging apparatus.

Another object of the invention is to thermal registration method that can provide results in real time.

Another object of the invention is to provide a thermal registration method with resolution which is superior to that of blackbody infrared cameras.

Another object of the invention is to provide a thermal registration method with resolution which may be utilized down to cryogenic temperatures.

Another object of the invention is to provide a thermoreflectance microscope utilizing the methods of the present invention.

Another object of the invention is to provide a thermal registration method having a simplified calibration procedure.

Another object of the invention is to provide a thermal registration method in which a low resolution thermal detection array can generate high resolution thermal maps and images.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Figure 1:
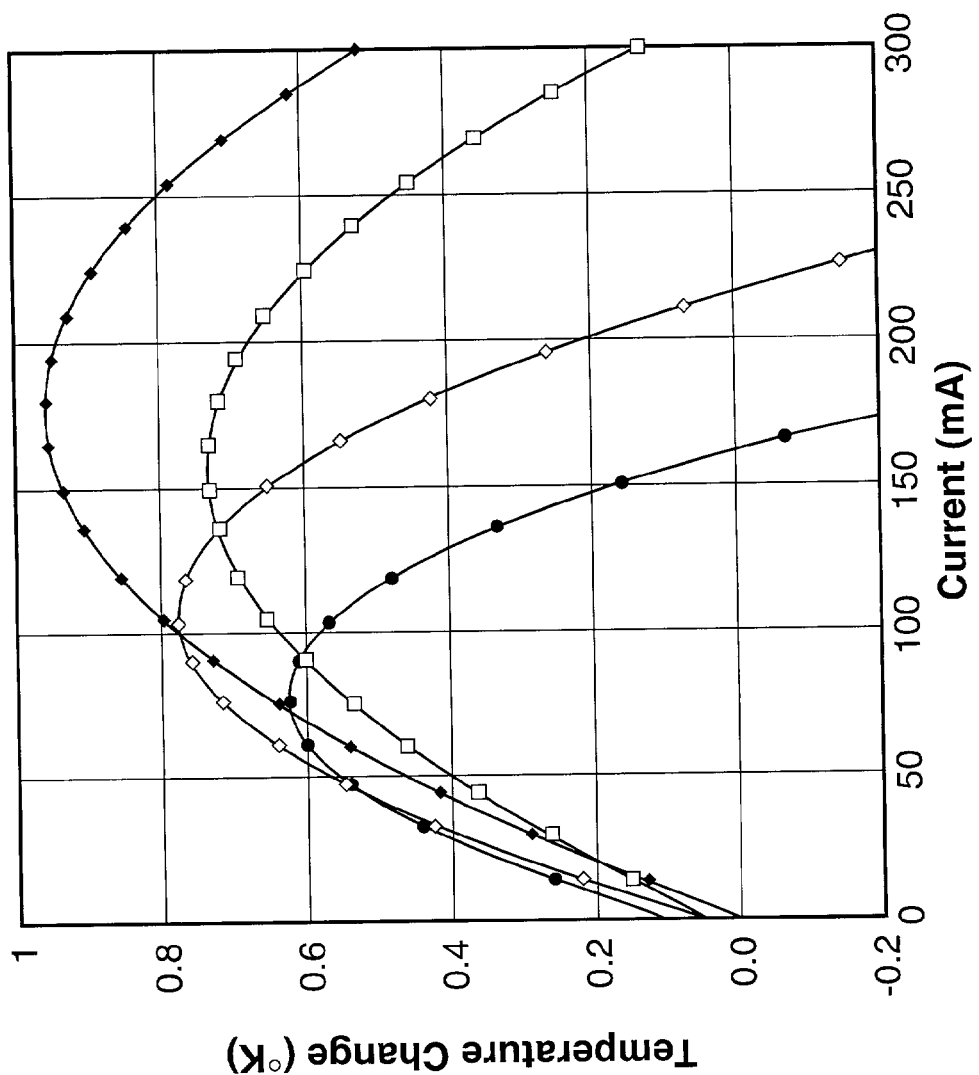
FIG. 1 is a graph showing HIT cooling as a function of applied current as registered by a conventional microthermocouple.

For illustrative purposes the present invention is embodied in the apparatus and methods described herein with reference to FIG. 1 through FIG. 15. It will be appreciated that the apparatus may vary as to configuration and as to details of the parts, and that the method may vary as to the specific steps and sequence, without departing from the basic concepts as disclosed herein.

1. Introduction.

The thermoreflectance method of the present invention relies on the fact that the reflection of a surface is dependent on its temperature. Thermoreflectance refers to excitation from an external source, wherein a relative change of reflectance is measured. Previous use of thermoreflectance as a measure of thermal excitation required that the surface be subject to a high temperature change, such as within the metal traces. Typically the previous thermoreflectance methods were capable of providing measurements of temperature change on the order of 10 degrees or more, and were looking at the transient response. The present invention, however, extends the utility of thermoreflectance by providing a thermal measurement method having sensitivity on the order of two orders of magnitude higher.

In accordance with the present invention, thermoreflectance is measured for a sample under test using an AC-coupled method wherein the signal generated from the detected reflection is filtered to provide a very narrow bandwidth, having a center frequency set at, or according to, the frequency of the thermal modulation of the sample under test. The narrow bandwidth of the filter should be less than 10 Hz and is preferably between less than approximately 0.1 Hz and up to 1 Hz. A number of narrow band filtering techniques may be utilized, such as a lock-in amplifiers, differential boxcar averaging circuits, or FFT analysis. In measuring transient thermal responses the method requires that the signal be recovered in the time domain.

The invention also includes a method of enhancing the resolution of the thermoreflectance measurements, wherein a series of images are registered at fractional pixel offsets and combined into an image of higher resolution than any of the original images. In providing high sensitivity, the present method can be applied to a number of applications, particularly active devices having micron and sub micron geometries, such as integrated circuits, MEMs, HITS, and similar devices.

2. Theory of Thermal Reflectance Measurement.

It is known that the reflection coefficient has a small linear dependence on temperature. The change in reflection per unit temperature is called the thermoreflectance constant and is denoted by $C_{th}$ where $$C_{th} = \frac{1}{R}\frac{dR}{dT}.$$

The reflection coefficient from air to a material with an index of refraction n is given by:

$$R = \left(\frac{n+1}{n-1}\right)^2.$$

Thus, if the temperature dependence of the index of refraction is known, the thermoreflectance constant can be calculated.

2.1 Thermoreflectance Constant of Gold.

Although it is difficult to calculate a theoretical value of thermoreflectance, values may be readily obtained through experimentation. Because the surface of a typical HIT device, and the surface of semiconductor devices in general have a gold surface layer, it is useful to know the thermoreflectance constant of gold. One available value for thermoreflectance of gold was found within experimental data obtained in 1966 by Garfinkel at room temperature. By way of example, if a laser light source is utilized having a wavelength λ of about 655 nm or 1.9 eV, then a photoreflectance on the order of $10^{-5}$ would be expected.

2.2 Skin Depth of the Probe.

In using thermoreflectance to measure thermal response, the contributions of underlying layers should be understood. For example, are the registered reflectance changes solely in response to temperature changes within a gold surface layer, or do they represent contributions from underlying layers? Therefore, it is necessary to determine the "skin depth" δ, which is given by Feynman as:

$$\delta = \sqrt{\frac{2\varepsilon_0 c^2}{\sigma \omega}}$$

wherein σ is the conductivity for gold and can found in a handbook to be 4.88e79 mΩ$^{-1}$. It can be calculated therefore, that at 655 nm the penetration of the laser should be approximately 3 nm into the surface layer, which is substantially less than the 1 μm (micron) typical thickness of gold being utilized, such as within a HIT device.

3. Thermoreflectance Laser Probe Setup.

Figure 2:
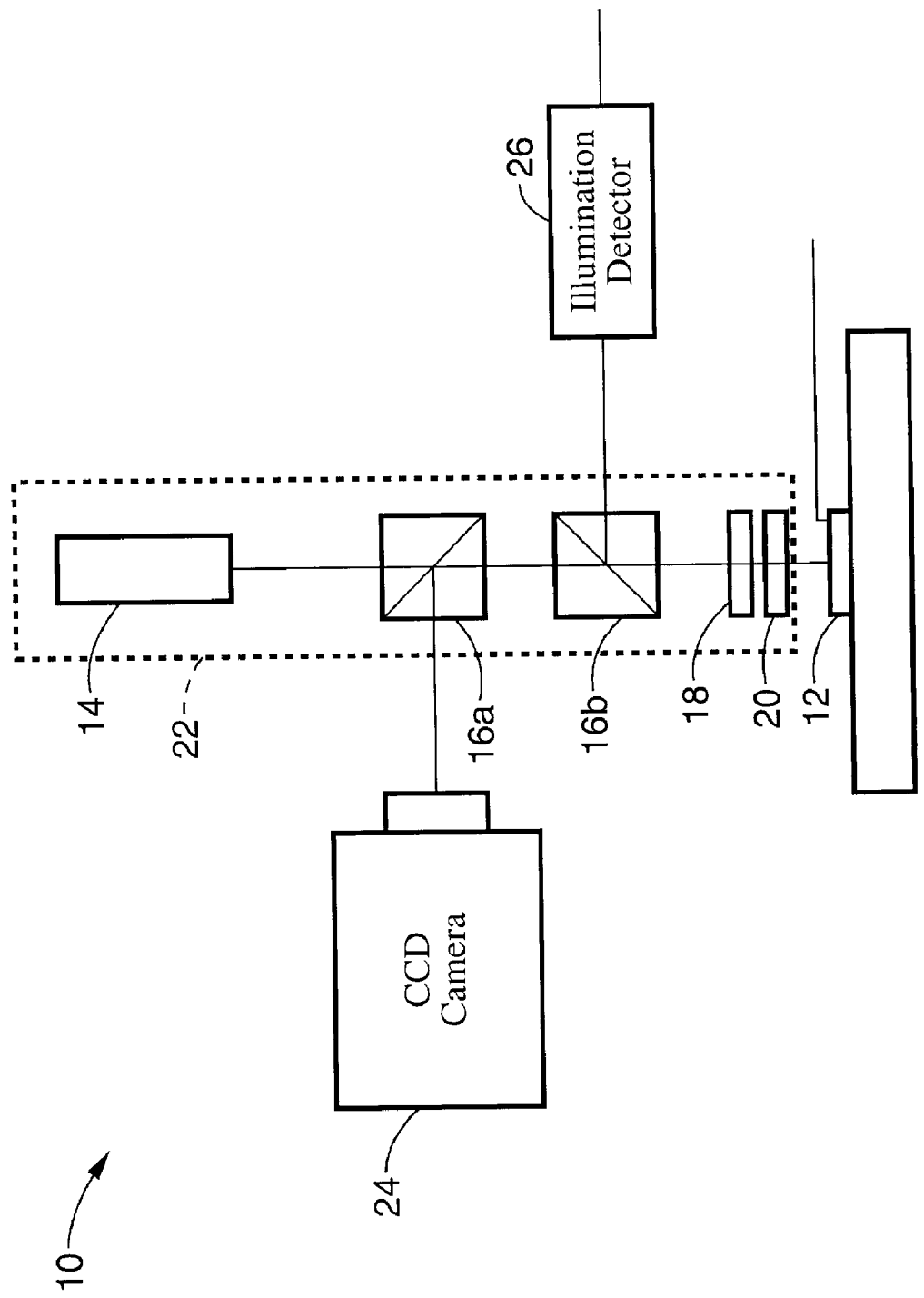
FIG. 2 is a schematic diagram of an apparatus for thermoreflectance measurement of a surface according to an embodiment of the present invention, showing a simplified arrangement utilizing a single detector.

FIG. 2 depicts a laser probe setup 10 for taking non-contact thermal measurements according to the invention based on temperature induced changes in thermoreflectance, from a sample 12 under whose surface material is of a known composition. The illumination source is provided by laser 14 whose light beam is directed onto sample 12 through two beam splitters 16a, 16b a quarter wave plate 18, and an objective lens 20, which are all preferably located on an x-y translation stage 22. The reflected light is therefore split between an imager, exemplified as CCD camera 24, and an illumination detector 26, such as an optical detector array, or other form of imager providing a sufficient dynamic range for the optical AC measurements. The use of CCD camera 24 within the setup allows optical positioning of the illumination, such as the spot from the laser beam, onto sample 12 while viewing the sample under test. It will be appreciated that the beam spot size in relation to the sample size determines in large part the degree of spatial accuracy provided as a result of the reflectivity registration. Preferably, the beam spot size should be approximately equal to or less than the desired spatial resolution; however, as will be described herein, an oversized beam may be compensated for as well.

3.1 SNR Calculations.

Obtaining precise thermal results requires obtaining a high signal-to-noise ratio. The signal-to-noise ratio (SNR) may be calculated for the laser probe setup of FIG. 2. It will be appreciated that the following one-dimensional analysis may be extended to two-dimensional image acquisition.

3.1.1 Noise.

To perform an overall signal-to-noise calculation for the setup of FIG. 2, the noise of all the different sources should be considered, and then added in quadrature, as given by:

$$\sigma_{total}^2 = \sigma_{source1}^2 + \sigma_{source2}^2 + \sigma_{source1}^2 + \ldots \sigma_{sourceN}^2.$$

3.1.2 Detector Noise.

The dominant contribution for the detector noise, is shot noise, then Johnson noise, and "1/f" or flicker noise that may be present in the system. Johnson or thermal noise is present in all resistors as follows:

$$\sigma_T^2 = \left(\frac{4K_B T B}{R}\right)^2$$

where $K_B$ is Boltzman's constant, B is the effective bandwidth, R is the resistance, and T is the temperature. For example, for a 2 KΩ resistor the current noise is 3 pA/pHz. For a 50 Ω load the current noise is 18 pA. While it would appear that a larger value of resistor would increase SNR, the choice depends on whether current noise or voltage noise is to be mitigated. Another noise contribution is due to the shot noise which arises from the discrete and random nature of electronic flow. The shot noise current is given by:

$$\sigma_s^2 = (2qIB)^2$$

where q is the electronic charge, and I is the current. For the expected signal current of about 200 μA, a noise contribution of approximately 8 pA/pHz is expected. Both of these noise sources contribute "white" noise, wherein the only method of reducing their contribution is by limiting the bandwidth of the source. Also the 1/f "flicker" noise should be considered. However, if the temperature can be modulated past the knee of the 1/f spectrum, then this noise can be reduced to a negligible value. In practice, the excitation frequency may be increased until this source of noise is sufficiently attenuated, such as up to 100 kHz.

3.2 Other Noise Sources.

The laser source itself generates noise from temperature changes and from the inherent fluctuations of the output power due to mode hopping, which may be difficult in some cases to estimate. However, this source of noise may be minimized by utilizing a spectrum analyzer to find a "quiet spot" within the temperature and the output power curve of the laser. As a result of dealing with small length scales, the noise generated by the vibration of all the components in our system should not be disregarded. The vibration noise may be reduced by stabilizing the base of the system, such as by utilizing a floating air table and dampened posts. The contribution of mechanical noise cannot easily be calculated although its influence should be minimized.

3.3 Reflectance Modulation and Expected Signal.

Consider the change in temperature as a function of current for the cooler:

$$\Delta T = \beta I^2 - \alpha I.$$

The dominant contribution, the value measured by the lock-in, of a square current pulse is:

$$I = \frac{I_0}{2}(1 + \cos wt).$$

Therefore, the change in temperature should be:

$$\Delta T = \frac{\beta I_o^2}{4}(1 + \cos wt)^2 - \frac{\alpha I_o}{4}(1 + \cos wt).$$

Assuming that a filter can be applied so that only a single harmonic that is at, or associated with, the excitation frequency is registered (thereby filtering out other signal components), then the following relation holds:

$$\Delta T = \frac{1}{2}(\beta I_o^2 - \alpha I_o)\cos wt.$$

As a result of the thermoreflectance $C_{th}$ being the reflection change per unit temperature, then it follows that $$\Delta R = \Delta T * C_{th} = \frac{C_{th}}{2}(\beta I_o^2 - \alpha I_o)\cos wt.$$

However, a large DC component exists, given by the relation $$R = R_0 + \Delta R \text{ also } R = \frac{P_r}{P_i}$$

where $P_r$ is the reflected power and $P_i$ is the incident power. Therefore, the power at the detector has been shown to given by:

$$P_r = P_i R = P_i R_0 + P_i \frac{C_{th}}{2}(\beta I_o^2 - \alpha I_o)\cos wt.$$

As a result, it is seen that the magnitude of the reflected signal at ω is proportional to the change in temperature.

The detector which registers the reflected light from the laser is AC-coupled within the present invention to eliminate the DC value, and spurious noise from other, non-thermal excitation, sources. It is important to find the minimum signal current that provides a sensitivity to a desired level of temperature resolution, such as to 100° mK. For a 1 mW level incident power, detector responsivity of 0.5 A/W, and a $C_{th}$ of $10e^{-5}$. The photodiode signal current should be:

$$I_s = (0.5)(P_i C_{th} \Delta T)$$

$$I_s = (0.5)(10^{-3})(10^{-5})(10^{-1}) = 0.5 * 10^{-9}.$$

It will be appreciated that a current of 500 pA is quite small. Utilizing the thermal and shot noise equations, the noise contribution is estimated to be 20 pA√Hz; therefore a narrow bandwidth will be required in order to register the signal. If the effective bandwidth is set to 1 Hz, then a signal of 500 pA signal is provided for a 100° mK change, with 20 pA of noise.

3.4 Heterodyne Filtering and Expected SNR.

In order to discern the small thermoreflectance signal from noise, a tight band pass filter around the frequency of interest is utilized to filter out noise, preferably by means of a lock-in amplifier, differential boxcar averaging, or FFT analysis of the signal. It will be appreciated that typical band pass filters are frequency selective on the order of 24 dB/octave. However, within the present invention, the bandpass filter should generally restrict the frequency range of interest to a single harmonic, which is generally below approximately a 10 Hz window, typically centered around the excitation frequency, and preferably constrained to less than or equal to approximately 1 Hz. By preferably utilizing lock-in amplifiers, differential boxcar averaging circuits, FFT analysis techniques, or similar narrow-band circuits, techniques, and combinations thereof, signal recovery is preferably provided within an effective bandwidth down to approximately 0.1 Hz or less. It will be appreciated that the band pass filtering may be performed using electronic circuits, or signal processors, to provide the narrow-band filtering in relation to the modulation of the thermal excitation on the sample under test. It will also be appreciated that the bandwidth-limited signal may be directly output to a display, collected in a data acquisition system, or processed by a computer or other computational element. A computer is preferably utilized to compute quantitative thermal measurements based on the change in registered surface reflectance, as determined by the thermoreflectance coefficient of the surface material of the sample under test, in response to temperature changes associated with the level of thermal excitation.

As a result of the bandwidth-limited filtering, the total noise component may be reduced to 6.3° pA/K of signal. Finally, the signal to noise ratio of our measurement may be estimated as $$SNR = 20\log\frac{I_{signal}}{I_{noise}} = 20\log\frac{500pA}{6.3pA} = 38dB.$$

This result is generally the best that can be expected over the fundamental noise sources. Experimental results indicate actual noise that is slightly higher but on the same order. With no current pulses to the devices, the photodiode reads close to 20 pA, which depends on the integration time (bandwidth) of the instrument. The most prevalent source of noise is correlated to the excitation pulse height, and is caused by the pulse generator coupling to the detector. After paying close attention to the grounding and shielding of the instruments, this noise source can be reduced but not eliminated.

3.5 Laser Probing; Experimental Results.

Figure 3:
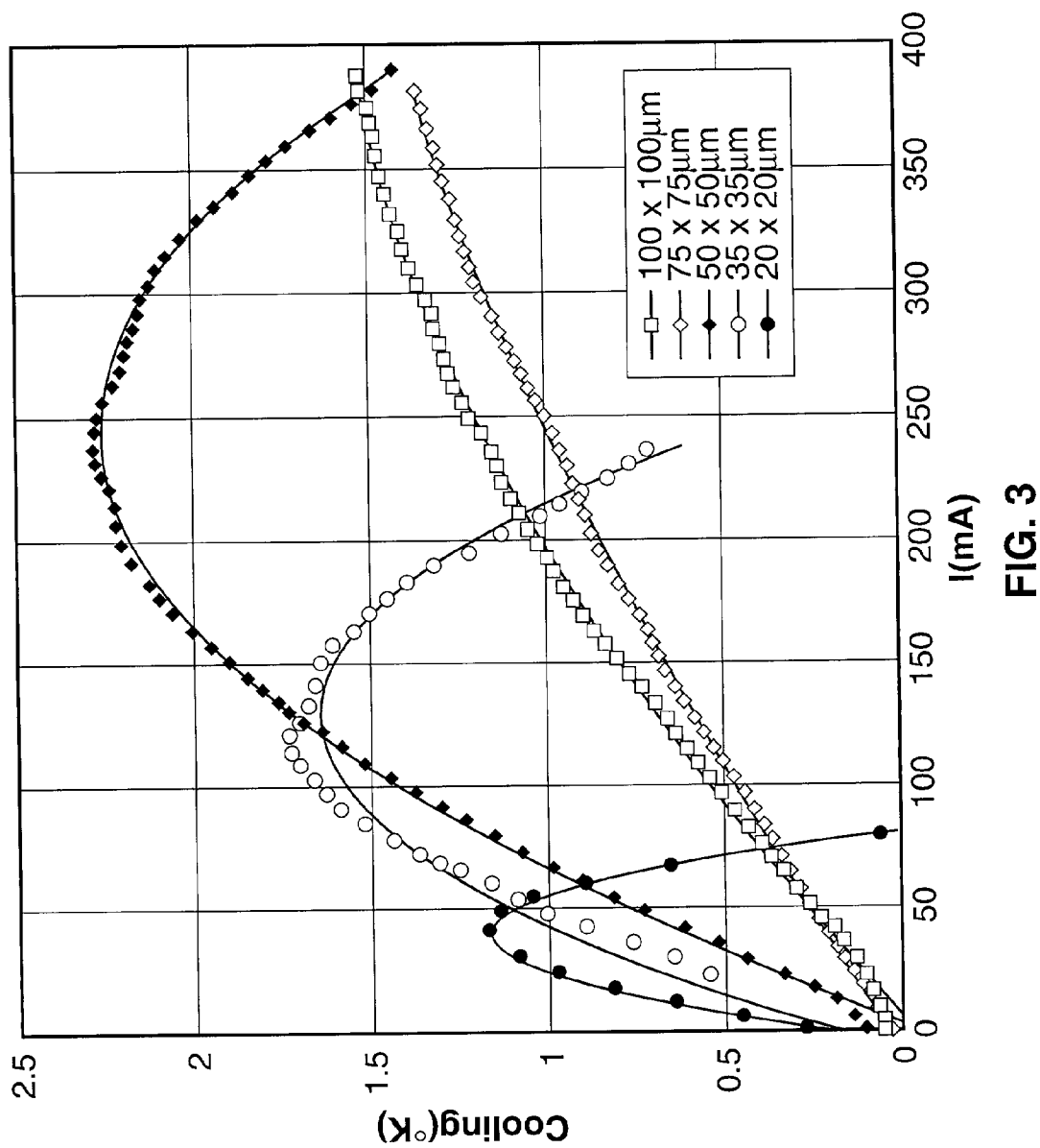
FIG. 3 is a graph showing HIT cooling in response to applied current as measured by a laser probing thermoreflectance method according to an embodiment of the present invention, showing response curves for different sized HIT devices.

Useful results were obtained from the laser probe embodiment, as presented in FIG. 3, which shows a sufficient signal-to-noise ratio for the application on HIT coolers. One item that has not been addressed so far is calibration of the cooling signal. It will be appreciated that the thermoreflectance constant for gold is currently not well characterized, while accurate experimental determination is non-trivial. The constant was assumed to be $5e^{-5}$; however, through later experiments and calibration with a thermocouple, the constant was found to be closer to $1.9e^{-5}$.

3.6 Extending Thermal Measurements to Two-Dimensions.

The discussion thus far has shown that it is possible to perform non-contact point measurements of surface temperature on a small scale. The next step extends the measurement into two-dimensions to generate thermal images of the semiconductor device. Using the thermoreflectance of the material, it is possible to generate images having superior temperature resolution, and spatial resolution, than provided by conventional thermal imaging methods.

The present invention may be practiced using a number of different methods for arriving at the thermal image. By way of example, the following three different imaging configurations can be readily utilized for performing thermal imaging using thermoreflectance according to the present invention:

1. a CCD camera, such as an off-the-shelf camera system coupled with a frame grabber and a data acquisition program (e.g. Matlab™) to recover the thermal map;

2. a photodiode array, such as a photodiode or CMOS detector array and a multiplexer which recovers the image by analog filtering of each pixel;

3. a laser scanner, such as using a laser probe in conjunction with photodiode and translating the laser beam spot on the object (e.g. using a motorized translation stage).

3.7 Imaging with Laser Scan.

Perhaps the simplest way to image a microrefrigerator, or other device, is to use the laser probe and simply move the spot around to different locations while registering the reflected bandwidth-limited intensity to generate a map. Currently, the size of the laser beam spot is on the order of 3 μm. The use of laser-scanning has proven effective for researchers investigating various devices, for instance MOS transistors, and telecommunication lasers. Piezoelectric translation stages have often been utilized with laser scanning to provide sufficient accuracy and repeatability when scanning the samples. It is desirable to obtain a spatial resolution extending to the sub-micron regime, wherein the use of image processing makes it possible to obtain a resolution that is not limited by the diameter of the laser spot size. However, it should be appreciated that the use of scanning to obtain adjacent "pixels" of thermal information reduces the obtainable spatial resolution due to the non-repeatability of mechanical translation. Thereby, the present invention preferably utilizes detector arrays for obtaining thermal information. A schematic of a suitable device and probe is shown in FIG. 2 as discussed above.

3.8 Imaging Resolution in Relation to Laser Beam Spot Size.

Any blurring of the laser spot can be modeled as a Gaussian distribution which corresponds to the first Airy disk. An inverse filter can then be created, such as a routine executing on a processor having access to the image data, for example using the routines within Matlab™, to remove the level of blurring exhibited within the image, which thereby results in a "de-blurred" image having with improved spatial resolution. A conventional noise model should apply to the laser scan, wherein $$g(x,y)=H[f(x,y)]\eta(x,y)$$

in which g is the measured blurred image, f is the true image, H is the blurring from the over-sized probe and η(x,y) represents the noise. In the frequency domain this equation may be represented as $$G(u,v)=H(u,v)F(u,v)+N(u,v).$$

If it can be assumed that the signal is much larger than the noise, then the above noise term can be neglected. In this case the pseudo inverse filter can be utilized with the stability factor γ to arrive at $$F(u,v) = \left[\frac{H(u,v)}{|H(u,v)|^2 + \gamma}\right].$$

The inverse transformation on F may then be utilized to recreate the image. However, it will be appreciated that having a small laser spot is still important because of the edge effects which result from the top surface of the HIT cooler (or similar topographical variations with other forms of devices) that is actually raised above the substrate by several microns. The model of Gaussian blurring no longer makes sense when half of the beam is over an edge. Using this technique the spatial resolution becomes the smallest distance between sampling points. It will be appreciated that the x-y translation stage should provide movement resolution that is approximately equal to, or higher, than the desired spatial resolution to which the sample is being measured. This level of resolution is not difficult to achieve as typical piezoelectric stages give controlled motion on the order of 20 nm, however, the repeatability of stage positioning can reduce the available spatial resolution. From the above analysis, it should be appreciated that sub micron spatial resolution can be achieved utilizing a high resolution translation stage.

3.9 Time and Expense Required.

Piezoelectric stages along with the sensors and software are generally available from laboratory suppliers, such as Thor Labs®, or Melles Griot®. Acquiring an image using the scanning method of the present invention is subject to the time required to translate through the number of passes desired to resolve the surface. It will be appreciated that providing an image map (two dimensions) is subject to increased scan time in comparison with determining a thermal profile along a specific bisecting line (one dimension). Typical translation stages for use with small geometry devices have resolutions on the order of 0.1 μm which would provide a limiting spatial resolution. If this resolution is considered to be the step size, then it may be preferred to provide at least one to two seconds to move and allow the system to stabilize prior to making a measurement. Therefore, in generating if a 100×100 pixel image, the time required to generate a thermoreflective image would be approximately six hours. Reducing the requirement to a 16×16 pixel image still requires an acquisition time of several minutes when considering only a one second average measurement time per point.

It should be appreciated that the description of collecting a series of measurements under static conditions for different locations on the device surface does not preclude obtaining measurements under dynamic conditions, such as while the translation stage is moving. The desired proof of concept purpose of the setup utilized herein, however, does not warrant the necessary motion characterizations of the translation stage and the optimization of the image collection electronics for capturing real-time images. It will be generally recognized that the static scanning method could be substantially sped-up by taking advantage of aspects of dynamic stability during translation.

3.10 Scanning Results using a Manual Translation Stage.

FIG. 4 through FIG. 10 are representations of images which were obtained using an experimental laser scanning setup as previously described. It should be appreciated that the scanning system shown in FIG. 2 was developed for the purpose of providing proof of concept information, and that further refinements to the setup are expected as the methods taught herein are applied to specific applications.

Figure 4:
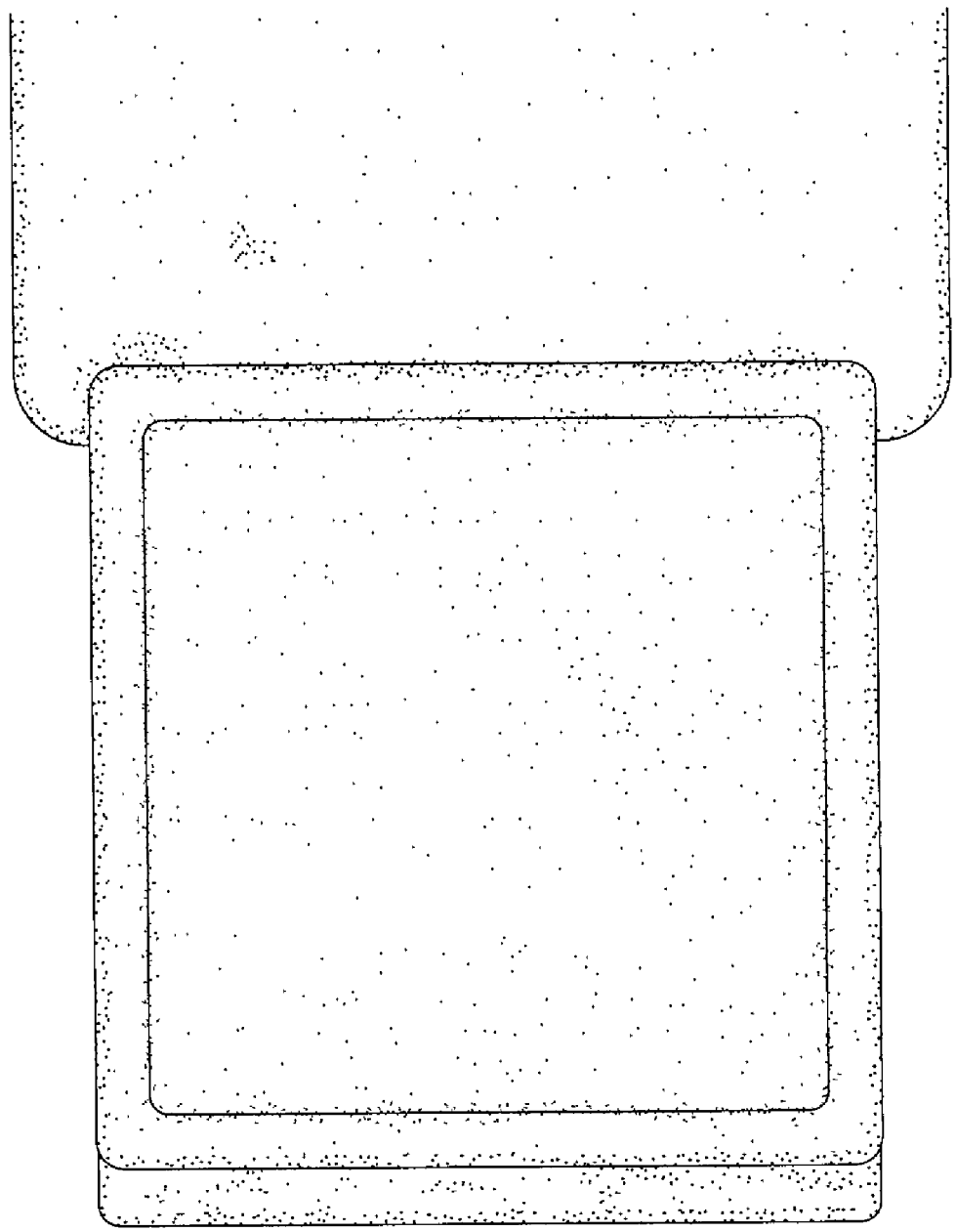
FIG. 4 is an image-representation of a HIT device that is to be scanned by the thermoreflectance method of the present invention.
Figure 5:
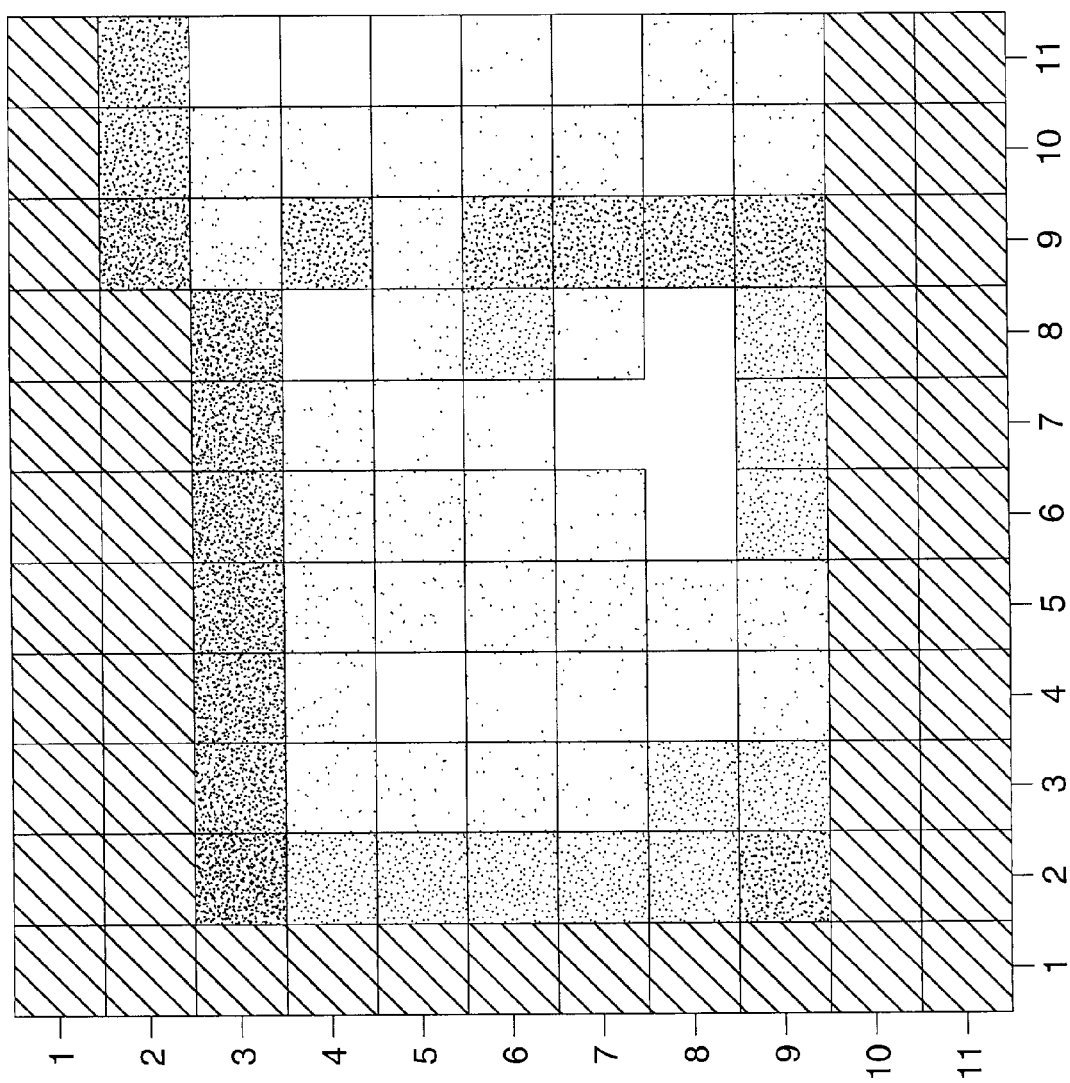
FIG. 5 is an image of the HIT device of FIG. 4, shown registered as a DC background image in response to a 300 mA applied current.
Figure 6:
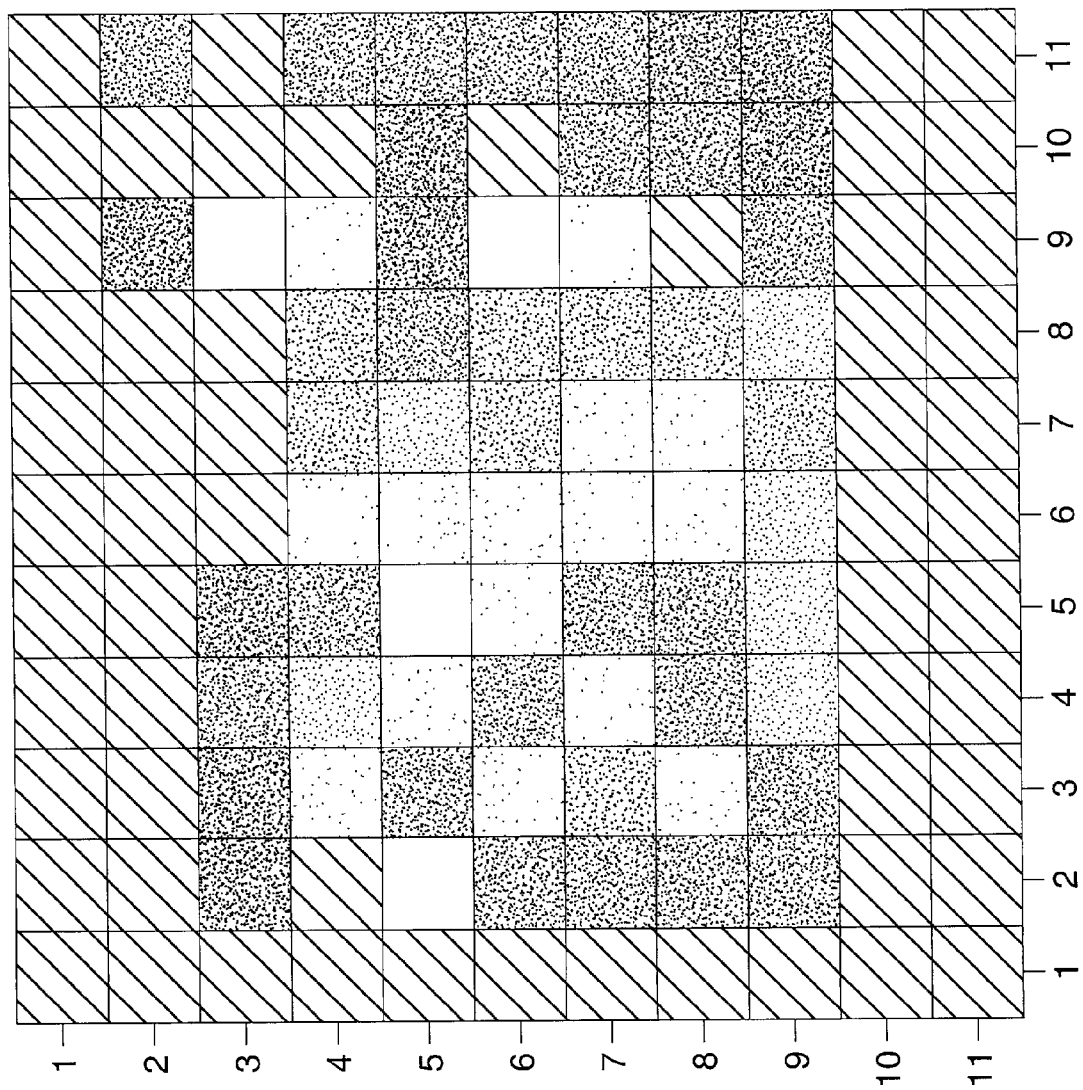
FIG. 6 is an image of the HIT device of FIG. 4, shown registering a thermoreflectance image in response to a 300 mA applied current.
Figure 7:
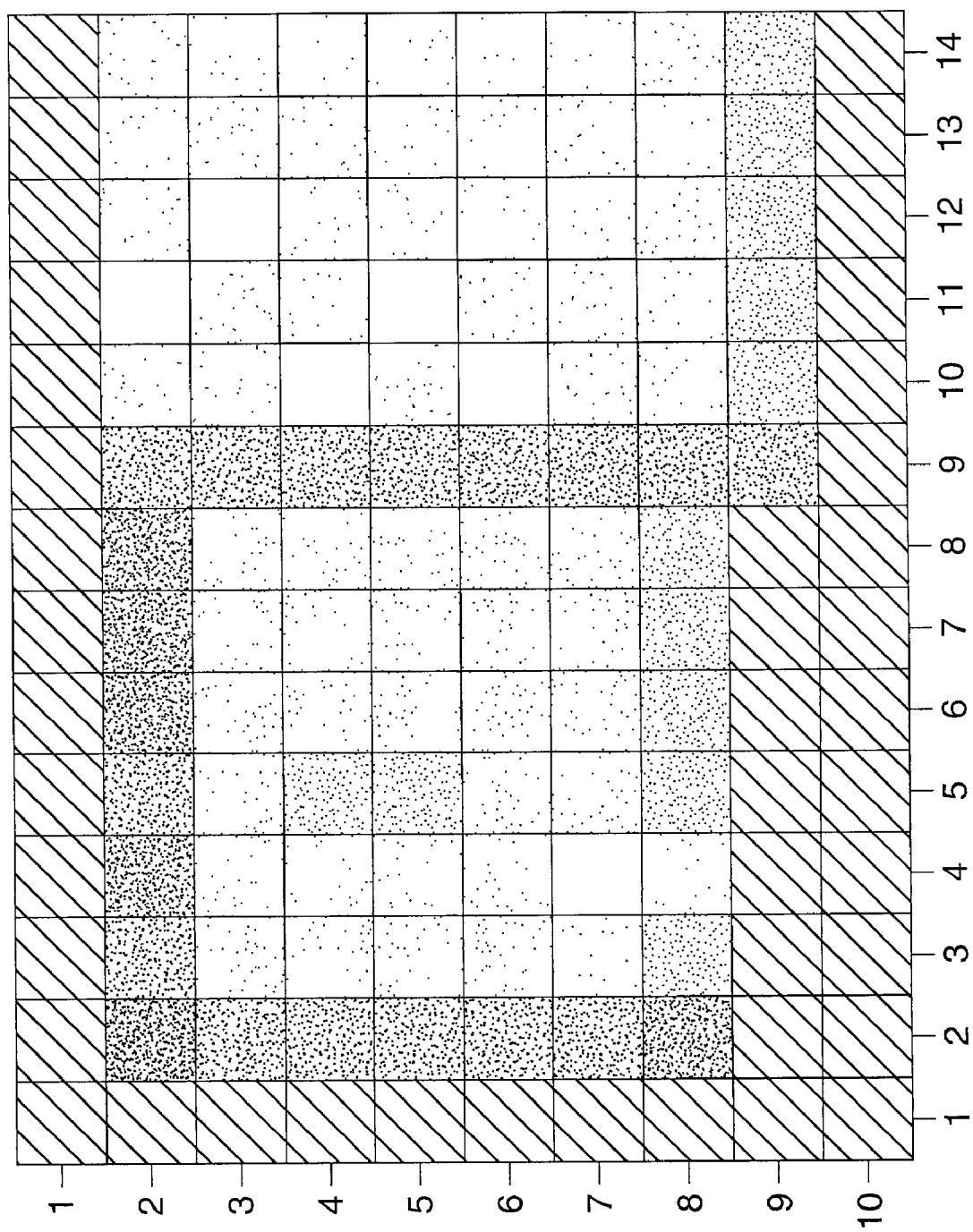
FIG. 7 is an image of the HIT device of FIG. 4, shown registered as a DC background image in response to a 200 mA applied current.
Figure 8:
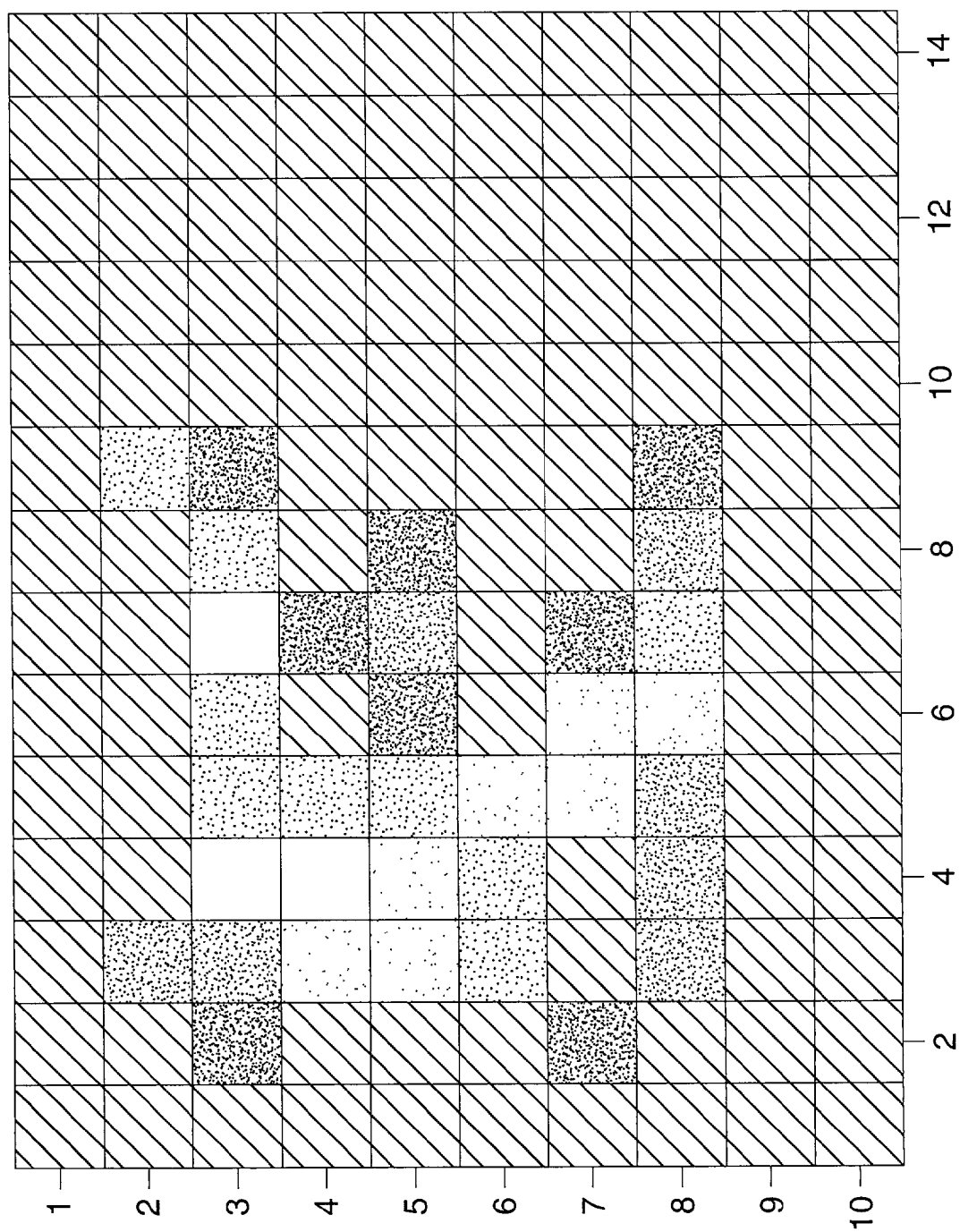
FIG. 8 is an image of the HIT device of FIG. 4, shown registering a thermoreflectance image in response to a 200 mA applied current.

FIG. 4 represents a HIT cooling device whose temperature profile is to be determined. During thermoreflective profiling, the laser apparatus may be moved to focus on different locations on the sample using a manual translation stage, such as one having a one micron resolution, to arrive at a rough image of device cooling within a HIT device, or other device. A sequence of representative images illustrate the HIT device to be scanned, and the AC and DC scanning point measurements. Two different trials were attempted at different levels of applied device cooling current. One hundred data points were taken for each image using the manual scan. For each data point the computer was configured to read fifty points from the lock-in amplifier and the DC voltmeter, and then to determine an average which was stored within a two-dimensional array. As a result of this process, the background changes were measured and thus variations in the surface was accounted for. FIG. 5 illustrates a DC background image subject to the application of a 300 mA cooling current, which essentially would appear as a low-pass version of FIG. 4. The corresponding narrow bandwidth-limited AC-coupled thermoreflectance image is represented in FIG. 6. Although the thermoreflective image appears noisy it illustrates temperature changes across the cooling surface of the HIT device. Even though the background image of FIG. 5 depicts that the contact layer connected to the cooler is quite reflective, it can be seen that the thermoreflectance image shows no cooling. There is an insulating layer of silicon nitride under the contact to prevent a current path, and there should be no cooling on the trace. Thus, we see that though the image is noisy, we are indeed capturing a thermal image. A second data set was attempted with more points on the contact layer to see a trend, and was performed at a slightly lower applied cooling current of 200 mA which is seen in the amount of cooling in the image. FIG. 7 represents a DC background image, while FIG. 8 represents and associated AC-coupled narrow bandwidth-limited thermoreflectance image.

4. CCD or Detector Array Imaging.

Another method of speeding the generation of the AC-coupled narrow bandwidth thermoreflective profiles and images is by illuminating and acquiring a reflected image over the surface of the device, or a portion thereof. By illuminating the entire surface of a device and capturing an image being reflected from that surface, it will be appreciated that a thermal image could be obtained without the necessity of mechanical scanning of the surface. By way of example, an imager capable of registering the reflected light, such as a charge-coupled device (CCD) imager, or a detector array, may be adapted to concurrently register reflected light over any desired area. It should be noted that a subtle but important distinction exists between the use of a detector array and a CCD.

Within a detector array each pixel may be randomly accessed, wherein the signals from each pixel therefrom may be processed in real time, such as by performing analog filtering of the signals which may then be simultaneously read out, or sequentially selected through a multiplexer, which facilitates AC coupling so that SNR may be significantly increased. In a CCD, however, charge from the light sensing pixel is immediately shifted out to a storage array after a fixed integration time and is digitized at the read out. A CCD, therefore, cannot support parallel analog filtering which is generally necessary for AC coupling, and therefore, the necessary increase in dynamic range for use within the present invention may not be obtained. It should be appreciated, however, that new or custom CCD structures may become available which can overcome the current limitations. Detector arrays, therefore, are currently preferred for use with the present invention and they may comprise any form of imaging element, such as standard PIN diodes, or CMOS sensor elements.

It is apparent from examining the functionality of CMOS arrays that some key characteristics of CMOS array sensors should be considered. For example, a CMOS array sensor may be configured as either active or passive. Active CMOS array sensors provide an amplifier at each pixel within the array. Either type may be utilized herein as the amplification may be performed off-chip if necessary. Another important consideration is in how each individual pixel acquires light. Some CMOS sensors have pixels that charge up, then discharge based on the incident light, while others start empty, then charge up. Both of these charge cycles are typically controlled through an external strobe input pin. It is preferable that the CMOS sensor utilized allows controlling the strobe pin so that the charging characteristics can be controlled externally by an appropriate choice of resistor amplifier network. If the pixel cannot be configured to continuously accumulate charge, then a similar difficulty arises to that of using a CCD, wherein AC coupling is not easily facilitated. A number of suitable sensors are currently available, one of which is a PIN array from Hammamatsu™, which provides a two-dimensional 16×16 active pixel photodiode array. The spatial resolution of sixteen elements per dimension appears coarse; however, it provides a suitable tradeoff between SNR and spatial resolution for the current application.

Two additional CMOS sensors of interest are offered by a Swiss company, CSEM™. One of these sensors is particularly well-suited to the present application as it provides an integrated heterodyne down-converter. The incorporated down-converter performs in similar manner to a lock-in amplifier, to narrow the bandwidth of the AC coupled signal being registered. The device purportedly operates in the frequency range of 10 kHz to 500 kHz, which is well-suited to our application. The device actually functions by using an FPGA to provide demodulate, but the acquisition of the signal doesn't allow for AC coupling. The other CSEM sensor is a 64×64 logarithmic array with the claim of greater than 120 dB of dynamic range. It would appear very advantageous to couple the logarithmic sensor with the demodulation FPGA of these two available sensor types. In any case, it will be appreciated that suitable sensors currently exist that will allow two-dimensional imaging to be performed, subject to suitable signal-to-noise ratios.

4.1 Noise in Detector Array Imaging.

Previous analysis of the signal-to-noise ratio for a point measurement indicates that if good thermal resolution is maintained for detector array imaging, that the resulting signal-to-noise level should be similar to that of the point case. The main difference is now the illumination of the device, which is spread across the whole sensor array. The following considers a calculation for the array to determine if limitations exist on the number of pixels within the array. For this analysis the assumptions are that each pixel of the detector array can be individually accessed and thus the charge integration can be controlled, such as by an external resistance. It is also assumed that the modulation frequency can be set past the knee frequency to neglect the 1/f contribution so we have the same equations as previously which then needs to be recalculated for a smaller signal:

$$\sigma_T^2 = \left(\frac{4K_B TB}{R}\right)^2$$

$$\sigma_s^2 = (2qIB)^2.$$

A 1 Hz bandwidth is assumed through the selection of a reasonable integration time. Choosing a load resistor is always a trade of voltage-gain versus speed, wherein with higher values of load resistance within the sensing element path, the current created by the liberated electron hole pairs appear larger; however, the same circuit also creates an RC and thus limits bandwidth.

The following considerations affect the minimum detectable DC signal per pixel. As the DC signal decreases, the dominant contribution becomes the thermal noise of the load resistance used, with 4 pA being the value at room temperature for a 1 KΩ load and a 1 Hz bandwidth. Thus we would like that the thermoreflectance signal to be least 10 times that or 40 Hz. Considering a thermoreflectance of $1e^{-5}$ this puts the DC value per pixel at 4 µA, which at a 0.4 level of responsivity corresponds to 10 µW per pixel. So we see that as we want to use more elements for higher spatial resolution, the total illumination of the device should increase. The number of elements, therefore, would be limited at some value as increasing the intensity of the incident light will begin heating the sample being tested. Considering a responsivity of 10 µW per pixel, a total reflected signal of 2.5 milliwatts for the 16×16 detector array would be required. In reality, the incident intensity will be higher because of the reflection coefficient of 0.9 and the beam splitter of 0.5, which would indicate that a light source of 5.6 milliwatts would be required. Power levels in this range are convenient, and it will be appreciated that low power lasers, such as being utilized herein, are capable of generating 5 milliwatts. However, these calculation assume only a 10:1 SNR per degree which may be in sufficient for many applications. In considering the situation for a 64×64 pixel array, the same calculation yields an illumination source of 80 milliwatts, while a 256×256 pixel array requires an incident power level of 1.2 Watts, which becomes a substantial amount of heating power to be focused on an area of about 100 µm². It will be appreciated that detector arrays from 2×2 on up to approximately 256×256 may be utilized within the present invention, while future increases in processing speed could allow extending that range to 1000×1000 detector arrays and so forth.

Another limitation on the number of pixels is the desire for real time signal processing, wherein increasing the number of pixels can substantially increase processing overhead. For real time image viewing, the data must be processed and presented as it is being acquired. Although a buffer should exist between the two systems, it should never be allowed fill up. Additionally, it will be recognized that for a constant illumination intensity, increases in the number of pixels within the array decrease the resultant SNR. As a result, the major tradeoffs that must be made in selecting the number of pixels within a detector array are available illumination intensity, allowable surface heating, required SNR, and the allowed computational overhead for the application. A detector array size of around 64×64 pixels is currently toward the upper limit, while the use of a 16×16 pixel array proves much simpler and less expensive to implement. It should be appreciated, however, that the methods of the present invention are applicable to pixel arrays of any size without departing from teaching herein as the available detectors and related circuits advance.

4.2 Increasing Spatial Resolution with Superresolution.

The present invention additionally provides a superresolution method for increasing the resolution of the AC-coupled narrow band thermoreflection images captured from a sample under test, by constructing a high resolution image from a given set of low resolution images of the same scene. A fundamental requirement for the method is that relative motion exist between the scene and the camera, thereby realizing a form of optical synthetic aperture.

In particular, providing superresolution imaging for the present invention entails the combination of images which are shifted by a portion of the pixel size, to increase the resolution of the resultant image. The movement between images must be estimated, or registered, so that amount of sub pixel offset is known. The ideal set of shifted images are those which are shifted by 1/N pixel lengths, where N is the desired increase in resolution, in the positive and negative of the two planar dimensions. Thus, in order to increase the image resolution by a factor of two, a total of four images is captured, with each image being shifted by 0.5 pixel in each direction. The resulting set of images is interpolated into one image with high resolution.

The acquisition of the shifted images can be accomplished in a number of ways depending on the arrangement of the system and if and how scanning is configured. The shifting may be accomplished with a translation stage for use with a single detector or detector array, or similar imaging element. The capture of shifted images, for example, can be accomplished in the lab quite easily, such as by utilizing translation stages with sub micron resolutions (e.g. 0.1 micron). It will be appreciated that knowledge of the pixel dimensions for the imaging elements should be known, as well as the fill factors, which should both be available from data sheets provided by the device manufacturer. Pixel size is typically on the order of 10 µm and fill factors (the space between pixels) are on the order of approximately 75%. Therefore, it is not difficult to mount imaging elements, such as CCD, detector elements, detector arrays, and similar devices, on the translation stage and utilize micrometers to move the sensor the desired amount of displacement.

Commercial thermoreflection imaging systems which incorporate this superresolution method should preferably incorporate automated mechanisms for shifting image capture. A number of methods can be utilized to arrive at these offsets, for example, massaging the data set, utilizing one or more piezoelectric translation stages, incorporating optical elements within the image path, capturing images during translation of a motion-characterized translation stage, dynamic shifting (e.g. induced vibration at a fixed amplitude and frequency corresponding with capture rate), and so forth.

The resulting sets of images are preferably combined using a processing element, or program such as Matlab, although complex hardware may be utilized in some instances. It will be appreciated that the resultant image resolution may then compensate for the use of lower resolution detector arrays, and similar limitations that were introduced into the image capture system. Unless high precision translation stages or similar high resolution positioning is utilized, the resolution increase would may be limited by manipulation of the data set rather than the acquisition of shifted images. It may also prove problematic in many cases to generate superresolution images at a sufficient update rate to maintain "real time" display response.

It can be seen, therefore, that another way to view the benefit of micro-scanning and enhanced resolution is by observing that the additional samples taken nearby each other allows for computation of higher order information about the underlying continuous function which is to be reconstructed. More specifically, consider the question in one dimension. Namely, assume that a function x(t) is to be reconstructed from its samples taken at equal intervals of length T, and denotes these samples by x[n]=x(nT). The Nyquist sampling theorem dictates that if the sampling interval T is sufficiently small, then the function can be uniquely reconstructed by interpolating the given samples using appropriate sinc functions.

In reality, the sampling rate often is not sufficiently high and some amount of aliasing will occur. Assume now that in addition to the set of samples x[n]=x(nT), two other sets of samples, displaced by a small distance δ from the original samples, are available as follows:

$$x^+[n]=x(nT+\delta),$$

$$x^-[n]=x(nT-\delta),$$

where δ is assumed to be much smaller than T/2. Using these three sample sets, the values of the function x(t) are more accurately computable than before. To see this, note that for a fixed n, and with all the given samples, both the value of the function itself at nT, and an estimate can be obtained rather accurately for the values of its first and second order derivatives at these same points. More specifically, the central-difference formula provides $$x'(nT) \approx \frac{x(nT+\delta) - x(nT-\delta)}{2\delta} \text{ and}$$

$$x''(nT) \approx \frac{x(nT+\delta) - 2x(nT) + x(nT-\delta)}{\delta^2}.$$

The error incurred in the estimation of these estimates is on the order of $\delta^2$, which is quite small.

The general requirement for the superresolution method of the invention then is that the collection of "microscanned" samples of the signal of interest, can be converted by computation to higher order image resolution. This information can in turn be utilized to more accurately estimate the function locally in the neighborhood of the sample points, hence obtaining higher frequency information. For the sake of completeness, it is noted that by collecting increasing finely divided image samples, increasingly higher order derivatives can be estimated.

The higher order derivative information is related to the higher frequencies present in the underlying signals, which may have been masked by aliasing in the original sample set. In fact, the higher order derivatives of the function provide information about the higher order moments of the Fourier transform of the function. Clearly, the computation of these higher order derivatives, and the subsequent reconstruction of the underlying signal, will be affected by any noise that may be present in the acquired samples. This highlights the numerical sensitivity of the superresolution process and the importance of carefully designed and statistically-based algorithms.

4.2.1 Superresolution by Microscanning.

The first step in realizing superresolution images is the estimation or registration of the frame-to-frame motion to within sub pixel accuracies. It will be appreciated that the motion required is that between the imaging system and the sample, such that either sample motion may be utilized, imaging system, or combinations thereof.

Assuming first that it is desired to capture a diffraction limited continuous image in which the maximum spatial frequency of D/1.22λf is present, where D is the diameter of a presumably circular aperture, λ is the wavelength of the illuminating light, and f is the focal length of the imaging system.

The Nyquist sampling theorem dictates that, to capture all diffraction-limited information from the continuous image on a discrete sampling grid, such as a detector array, CCD, or similar, and to achieve the maximum resolution up to the diffraction limit, the sampling grid requires interpixel spacing of no larger than S=1.22λf/2D. If the pixel spacing on the CCD can be denoted by s, then the avoidance of aliasing requires that s≦S.

It is expected that in actual practice, this condition will not often be satisfied, and as a result much of the high spatial frequency information contained in the continuous image will appear to be lost. However, this information is present in a aliased form in the low-resolution images. The goal, then of video superresolution is to retrieve this information from multiple micro-scanned images.

Defining the value K=s/S as the resolution deficiency or quality factor of the imaging system, the closes integer to this ratio, $\overline{K}$, can be interpreted as an indicator of the resolution enhancement factor needed to recover all the aliased information up to the diffraction limit. A simple calculation illustrates that the number $\overline{K}$ for the 16×16 array is on the order of seven, which indicates that a significant amount of resolution improvement may be attained. The integer $\overline{K}$ also is indicative of the amount of relative sub pixel motion required in each direction to achieve this resolution enhancement. In particular, enhancement by a factor of $\overline{K}$ would require sub pixel motion on the order of $1/\overline{K}$ in every direction, which in turn implies that nominally $\overline{K}^2$ microscanned frames should be available.

In our recent work it has been determined that the described resolution enhancement can be achieved in practice, if the relative motion between the frames can be accurately estimated, determined, or controlled. The practical results were obtained using images from custom FLIR camera, and an available digital camera, wherein the superresolution method provided up to a factor of five resolution enhancement. Furthermore, the method can be efficiently performed as "blind" superresolution, in situations wherein the characteristics of the imaging system, such as its spread-function of PSF, are not known a-priori. Using the approach provides for adaptive estimation of the camera PSF directly from the low-resolution images.

The superresolution algorithm operates by iteratively combining low-resolution images into a high resolution grid and removing the effect of the PSF of the imaging system. Given that the frames are separated by any given sub-pixel amount, the operation of the algorithm is the same. One the diffraction limit is reached, the only limit to the further extraction of high resolution information from the images is the presumed bandwidth-limited nature of the optical PSF of the imaging system. It is common to assume that because of the bandwidth-limited nature of the optical transfer function of the imaging system, the recorded image is also strictly bandwidth-limited in it frequency content. Although this assumption is technically valid, it may be argued that information from above the diffraction limit exists, in a nontrivial form, within the bandwidth of the recorded low-resolution frames. To appreciate this it should be recalled that the Fourier spectrum of a circular aperture, which is a space-limited function, results in the famous Airy function which has infinite support in the 2-D frequency plane. In practice the information content in the tails of the Airy function is not only small, but also possibly masked by noise. Regardless of the noise, this information if mapped to the region within the diffraction band due to the space-limited and discrete nature of the image acquisition process.

Another way of considering this is by observing that the Fourier transform is an analytic function. An important property of such a function in the complex plane is that if values are known over a compact region of the plane, then its value over the entire plane are uniquely determined. In practice, the analytic function is measured, which comprises the Fourier transform of the image, over a finite region in the spatial frequency plane, as determined by the diffraction limit. The mathematical theory of analytic continuation then allows, at least in principle, the recovery of information which lies beyond this limit. As a result, in the absence of noise, arbitrarily high frequencies above the diffraction limit should be recoverable.

In relation to the superresolution method described, two general comments should be considered. First, the process of analytic continuation, which has been demonstrated, is extremely numerically unstable, and attempts to use the method in the spatial frequency domain have not been successful from a practical standpoint. The iterative method of the present invention operates in the pixel domain wherein the problem may be posed in a more favorable setting and can be stabilized using advanced tools of numerical analysis. Secondly, the omnipresent noise in any imaging system requires the application of advanced statistical techniques in the image pixel domain to "regularize" the problem. The application of these techniques may be likened to the implicit insertion of additional information into the reconstruction process to yield improved results.

4.3 Thermoreflectance Imaging with a CCD Sensor.

One desirable method of performing thermoreflectance imaging according to the present invention would be to use a CCD camera in combination with digital signal processing, such as provided by Matlab files, to recover the image. This method would be very simple and inexpensive to implement. However, such a system may require nontraditional circuitry and image processing to reach sufficient levels of sensitivity for thermal imaging.

In considering conventional CCD imagers, it will be appreciated that CCD cameras typically have greater spatial resolution than provided by a 64×64 pixel array, and many offer binning functions wherein a group of pixels can provide an output which operates as a single pixel. One of the negative factors about using a CCD in this application is that the way that a CCD functions to sample a pixel and immediately store it in an array, the pulses then being converted to a digital word and shifted out. As a result it is difficult to AC couple the individual pixels prior to the analog to digital conversion process (ADC) which results in the dynamic range of the imager being used up in the conversion of the "background" DC image. A high pass filter can be implemented after acquisition, yet the number of bits necessary just to register a one degree change in the ADC can be prohibitive, and a dynamic range would be required which is on the order of the thermoreflectance coefficient itself, such as $1e^{-5}$ in the case of gold. Therefore, $2^{16}$ bins would be necessary just to register a one degree change, or more like $2^{20}$ bins, or twenty bits, to provide any useful resolution. However, even when using 20 bits it is still uncertain as to whether the signal may be properly recovered from the noise. It will be appreciated that reducing the requirements on dynamic range may be achieved by modifying the design of CCD imager or by creating an optical high pass filter in the time domain. These more exotic solutions utilizing the present methods may hold promise toward increasing the thermal and spatial resolution, although the focus herein has been primarily on immediate implementations which may be inexpensively realized.

4.4 Noise in a CCD Camera System.

According to a conventional measure, the CCD noise is given by:

$$<n_{sys}> = \sqrt{<n_{shot}^2> + <n_{floor}^2>}$$

$$<n_{floor}> = \sqrt{<n_{pattern}^2> + <n_{reset}^2> + <n_{on\text{-}chip}^2> + <n_{off\text{-}chip}^2> + <n_{adc}^2>}.$$

The shot noise is dependent on the signal magnitude whereas the noise floor is dependent on the design of the CCD. It is preferable that the 1/f source of the on-chip and off-chip electronics, be minimized, such as by assuming that we can excite the sample past the knee frequency. However, this may not be realizable in the case of a CCD, or similar imager, as a consequence of internally processing the information as a DC signal. Pattern noise is due to different values of dark current at each pixel, wherein the dark current is due to thermally excited charge carriers in the semiconductor sensing pixel. During measurement there will be a large DC input; therefore, the dark current will appear much smaller and can be neglected because in this case, the image will have to be normalized due to surface changes anyway. Hoist uses reset noise as the thermal noise generated in the sensing resistance. This is the same as the thermal noise in the previous case, although now, the CCD designer chooses the resistance, and it is fixed. The on-chip and off-chip noise arises from the amplification of the signal, such as within two stages, and comprises 1/f components, which are difficult to estimate and may substantially vary from one CCD imager to the next. ADC noise arises from the effects of quantization, which can be neglected if the conversion is performed with a sufficient number of bits. Essentially, it appears that estimating the noise floor is quite complicated as it depends on many choices being made by the CCD designer. It is perhaps more valuable to consider only available cameras (imagers) and the claimed noise. Taking into consideration the noise model, off-the-shelf CCD cameras can be compared to determine if sufficient dynamic range exists for detection of the signal, and if the noise floor of the CCD will be low enough, so that the signal is not overwhelmed. In actuality, the dynamic range and noise floor are very closely related metrics. It would not be prudent to select an ADC, for use with a CCD system, in which the least significant bit of the ADC is dominated by noise. Evaluating a number of currently available CCD camera data sheets it was found that the highest dynamic range cameras available were cooled CCD's offering only 16 bits of resolution, which is still not generally considered sufficient to achieve the desired thermal resolution. In addition, these high-resolution cameras are often extremely expensive in relation to the costs associated with detector arrays of moderate size.

4.5 Methods of Interest Relating to CCD Imaging.

4.5.1 Stroboscope.

One interesting method outlined by one researcher for photothermal image capture is the "stroboscope" method. This method utilizes a CCD camera and claims to be able to measure the joule heating of a resistor as well as the Peltier effect. The method excites the sample at a first frequency and strobes an LED at a different second frequency, whereafter the reflected signal is down-converted to 30 Hz. The claim is that the amplitude and phase can be recovered by analysis of the four integrals that correspond to different phases of the signal. The measured image is represented by s(x,y,t) and given by:

$$I_1(x, y) = \int_0^{T/4} s(x, y, t)dt$$

$$I_2(x, y) = \int_{T/4}^{T/2} s(x, y, t)dt$$

$$I_3(x, y) = \int_{T/2}^{3T/4} s(x, y, t)dt$$

$$I_4(x, y) = \int_{3T/4}^{T} s(x, y, t)dt.$$

It is then claimed that the magnitude of the response should be:

$$R_1 = \frac{4\pi}{T\phi\sqrt{2}}\sqrt{(I_1 - I_3)^2 + (I_2 - I_4)^2}$$

where $\phi$ is the amplitude of the modulating LED and T is the period. These integrals are averaged over two-thousand times. Essentially this method provides sampling at four times the excitation frequency, then differences the images in time as a form of AC coupling. However, in the case of the present thermoreflection imaging application, the large absolute value of the reflection coefficient is being aliased into the integrated image.

The following considers what the temperature resolution should be for the above form of setup. The camera that is used in this experiment is the DALSA CA-D1 which is a 12-bit resolution camera. Assuming a gain that is optimized just below saturation, the smallest difference it could provide would be one bit, which with 4096 possible combinations yields a 1:4096 dynamic range. If we assume that the reflection surface is silicon with thermoreflectance of $1.5e^{-4}$, then they should only be sensitive to a three degree temperature change, without beginning to consider noise contributions. It can be seen that the provided level of sensitivity is generally insufficient for measuring the thermionic coolers which typically cool on the order of one to two degrees, and other devices to a similar level of precision. In fact, in evaluating the results given for the method the scale only shows relative units, however, the power dissipated for detection of the Joule effect is on the order of 1 W, 50V across 2.5KΩ and is far less sensitive than what is being sought.

4.5.2 The Lock-in CCD.

Another researcher has described the use of a lock-in CCD for two dimensional detection of light, and is strikingly similar to the stroboscope research. Essentially the method describes acquiring an image at different phases and then using differencing to provide a 'locked' image. Although this is true, the problem of quantization arises again, and the experiment was intended to recover a 20:1 background to signal ratio. Information about the method pointed out that "the dynamic range of the demonstrated device is substantially lower than existing lock-in detectors, because no physical mechanism has been identified yet that would be capable of forming differences in the charge domain without resorting to active devices (FET's) significantly increasing the noise level." Using a detector array might be one of the few options available for thermal imaging with a sensitivity down to 0.1 degrees.

5. Hardware Configurations for Thermoreflectance Imaging

Experiments in a lab environment utilized a manual laser scan to generate a thermal image of a thermionic cooler, and it provided reasonable, although somewhat noisy results. The time required and the expense of a piezoelectric stage are the main drawbacks for this method. However, The advantages of this method are that with a laser, the amount of incident light can be easily controlled to enhance SNR, and the spatial resolution is at the smallest step of the stage which is generally about 50 nm. Thus, it appears that laser scans are capable of providing results with both higher overall spatial resolution, and higher temperature resolution, than results obtained from either a detector array, CCD, or similar array device, although the image acquisition time suffers accordingly. The lack of sensitivity and the difficulty with implementing AC coupling with conventional CCD devices, that lack AC-coupling circuitry, differential boxcar averaging, or similar bandwidth limiting mechanisms, significantly limit their use, and after some study within the present invention it was not possible to use a one of these generic CCD cameras to recover the thermoreflectance signal with resolution of 0.1 degrees. Experiments which were reviewed that attempted AC imaging with a CCD did not yield sufficient sensitivity for the present application. Furthermore, analysis of CCD noise and SNR per pixel illustrate that DC image acquisition with filtering as a subsequent stage will generally not overcome the sensitivity problems. It will be appreciated that all forms of image processing won't be able to correct for a signal whose dynamic range is constrained during acquisition and quantization. Therefore, currently these CCD's which are not configured for narrow band registration of illumination do not provide sufficient dynamic range, and/or the AC-coupling which would be suited to our application.

6. Imaging with Hammamatsu 16×16 Detector Array.

6.1 Signal Processing Required to Acquire the Thermal Image.

One imaging detector utilized for the present invention incorporated a 16×16 photodiode array produced by Hammamatsu® (C4675-103) which was provided by Stanford Research Institute (SRI) to allow imaging with sufficient dynamic range to acquire the signal, and was capable of capturing AC images up to 256 Hz by performing a "real time" fast Fourier transform on the data. The maximum image frequency was dictated by the speed of processing the time series on each pixel. It will be appreciated that both vibration and temperature sensing require sensitivity to "contrast", which may be defined as the ratio of the light modulation (AC) signal to the much larger ambient (DC) light intensity. The sensitivity is provided by eliminating the DC component using a high pass filter (AC-coupling) in each channel, such as prior to second stage amplification. The camera achieves high dynamic range with different AC, and DC gain. After the first gain stage in the detector head, the DC signal is attenuated by factor of 0.6, while AC coupled channels receive additional gain of 240. The third gain stage is at the input to the ADC which also can provide separate AC and DC gain. Without this, the amplifier would be saturated by a large DC component. After the amplifiers, the 256 channels are digitized by four National Instruments data acquisition boards which are connected in parallel.

Each board has 64 analog inputs, which are multiplexed to a 16 bit ADC. Each ADC digitizes 64 channels at 100 kilo-samples/s, so that the maximum frame readout for this setup is 1.6 kHz. The use of the AC-coupling and the differential AC/DC gain provide an effective 24 bits, 140 dB, of dynamic range in contrast, and all channels are preferably configured with anti-alias filters. A data-acquisition program was developed using LabWindows™ from National Instruments® running on a PC within the Windows-NT™ operating environment of MS®. The acquisition program reads out the digitized data from the ADC circular buffer each second, transferring the data to a hard drive, and performs real-time analysis to display results updated each second.

It will be appreciated that certain considerations should be taken into account within any AC-coupled thermoreflectance measuring setup. One factor is the AC noise, such as may be introduced from power supplies and other oscillating sources. Such AC noise can degrade the results and may require non-optimal selection for modulation frequency. It is therefore preferable that the noise sources be eliminated or tightly controlled, such as by eliminating the effects of power-supply ripple by using a battery power source. Another large factor in taking measurements is the thermoreflectance signal. The magnitude of the temperature-induced modulation is extracted from the AC-signals arriving from each photodetector when using a lock-in technique. It is necessary to divide the total DC light magnitude to calculate the contrast, and by multiplying the appropriate thermoreflectance coefficient the corresponding temperature modulation may be calculated in degrees Kelvin. In practice, the surfaces under test should be characterized as to their thermoreflectance coefficients, so as to provide accurate results for devices of various constructions.

The LabWindows™ environment allows viewing the light components associated with any particular modulation frequency. An effective 1 Hz bandpass filter may be thereby achieved by calculating Fast Fourier Transforms (FFTs) for all 256-channels at each second, which can be performed on our particular PC at frame rates up to 512 Hz, which allowed us to view an image of the light modulation corresponding to the temperature modulation frequency.

In considering the more powerful "lock-in" technique, it will be appreciated that it operates by beating the signal against the actual driving modulation, such as by using both phase and frequency. In a previous test the current pulse was synchronously digitized in producing the temperature modulation and the "lock-in" analysis was reproduced in software. Hardware-induced ramps phase ramps exist due to the 64-channel serial digitization on each ADC board, however, these may be calibrated out. It will be appreciated that a procedure is preferably utilized to calculate and correct for this phase problem.

6.2 Signal Processing Required to Acquire the Thermal Image.

Several processing steps must be performed prior to arriving at a thermal image. They are normalization, recovery of phase image, and correcting for different thermoreflectance constants of different materials. The temperature change is proportional to the AC signal at the cycling frequency over the DC signal for each pixel. To obtain the DC value from the SRI camera, the value at 120 Hz was used as the overall reflectivity. Some points in the image will be heating or cooling. It is fairly easy to obtain the magnitude of the signal at the cycling frequency, but the sign of the signal is not easily known. By identifying the phase of the signal, the cooling and heating points can be determined. This problem is exacerbated by the problem that the channels are not exactly read in parallel. There is a slight delay from each channel on each data acquisition board, and there are four boards in parallel. Finally, it becomes necessary to correct for the different reflection surfaces. The thermal image is the micro-cooler top surface, of gold, but there is also the surrounding area of the substrate.

The substrate of silicon, Si, has a fairly well known thermoreflectance value of $1.5e^{-4}$. Thus points on the silicon surface can be determined and corrected for. In order to view a "real-time" image, all of the above steps should be processed in a sufficiently short interval in relation to the display updates. The most computationally intensive operation is that of performing a Fourier transform on the data simply to provide enough filtering to see the thermal signal. The other signal processing steps are far less computationally intense. Improved calibration information and methods would increase the utility of the present thermoreflectance measurement method. The images were processed using a value of $1.9e^{-5}$ for the reflectivity coefficient for gold, which was arrived at by measuring the cooling on a 50 µm device with a microthermocouple and then correcting the optical data.

6.3 Experimental Results from the SRI Camera.

Figure 9:
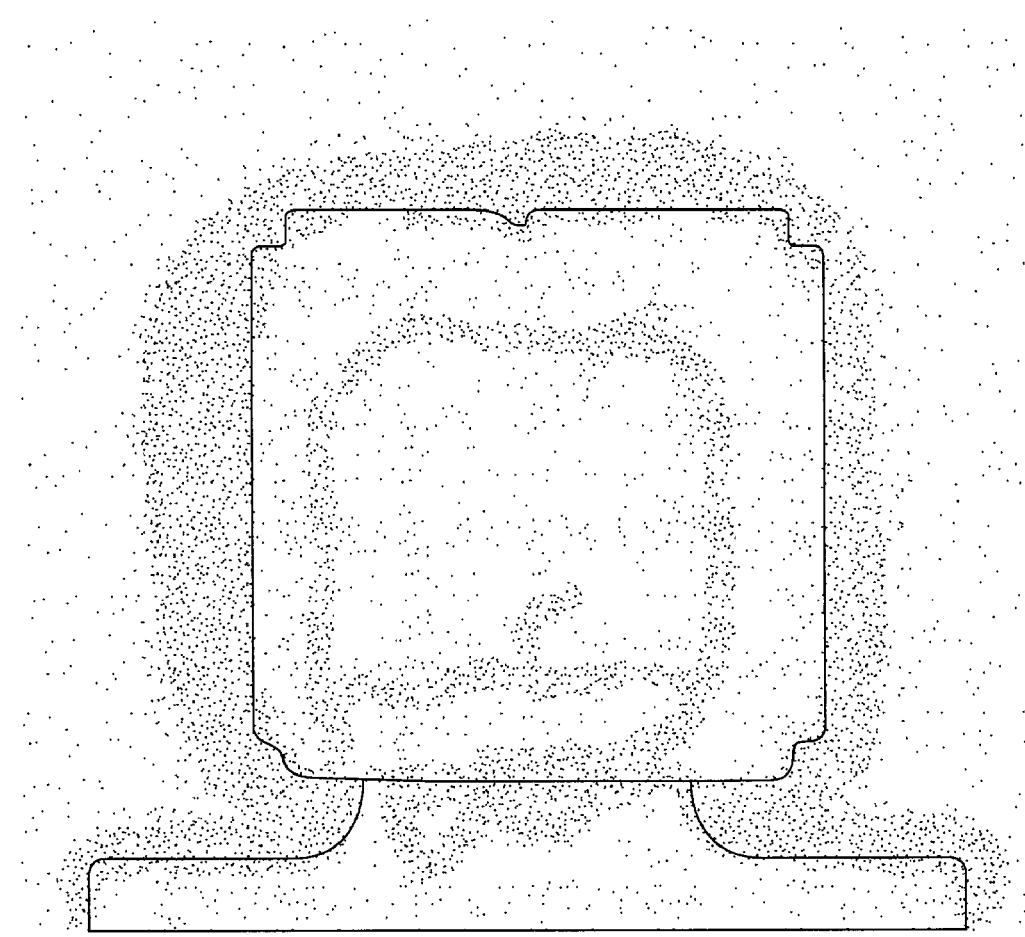
FIG. 9 is an image-representation of a 30 µm HIT device that whose thermal response is to be measured.
Figure 10:
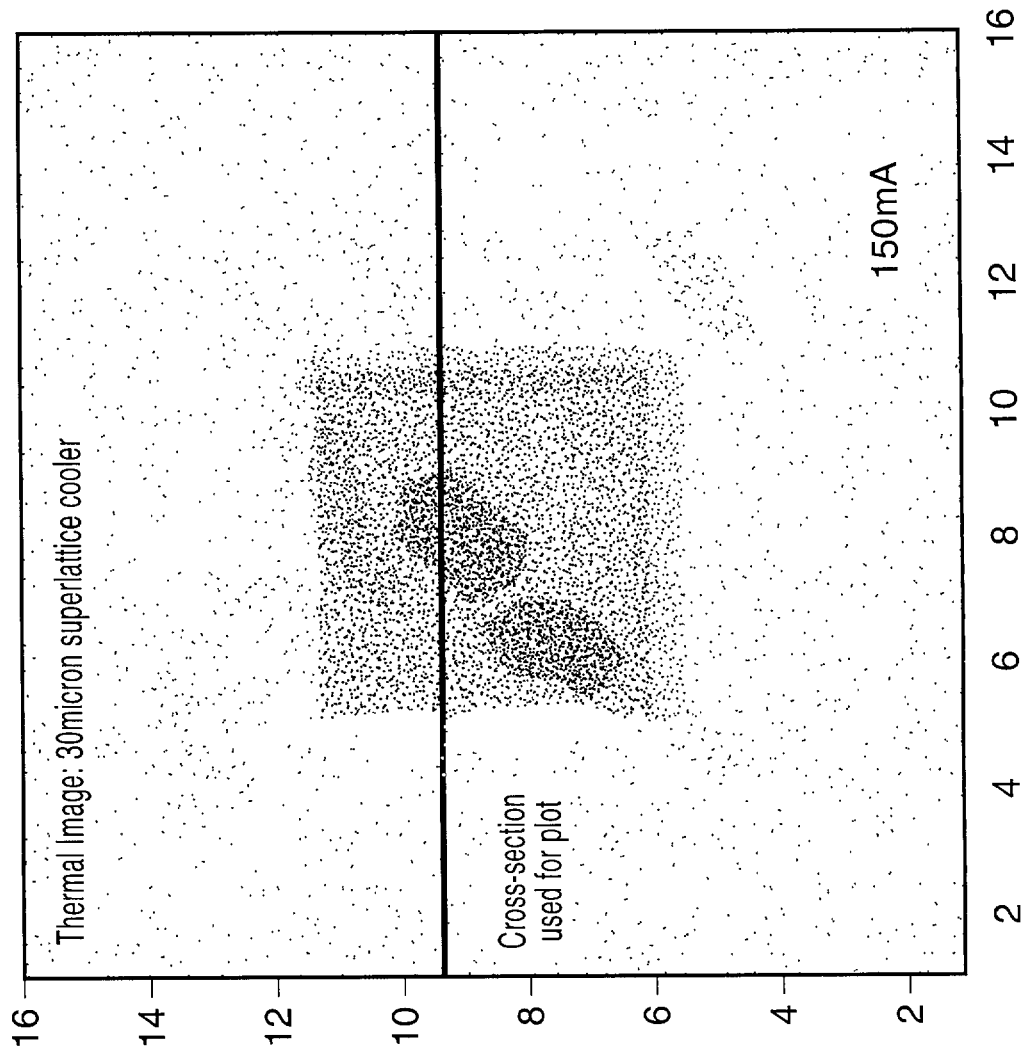
FIG. 10 is an image of the 30 µm HIT device of FIG. 9 registered by thermoreflectance according to the present invention, shown near peak cooling current of 150 mA.
Figure 11:
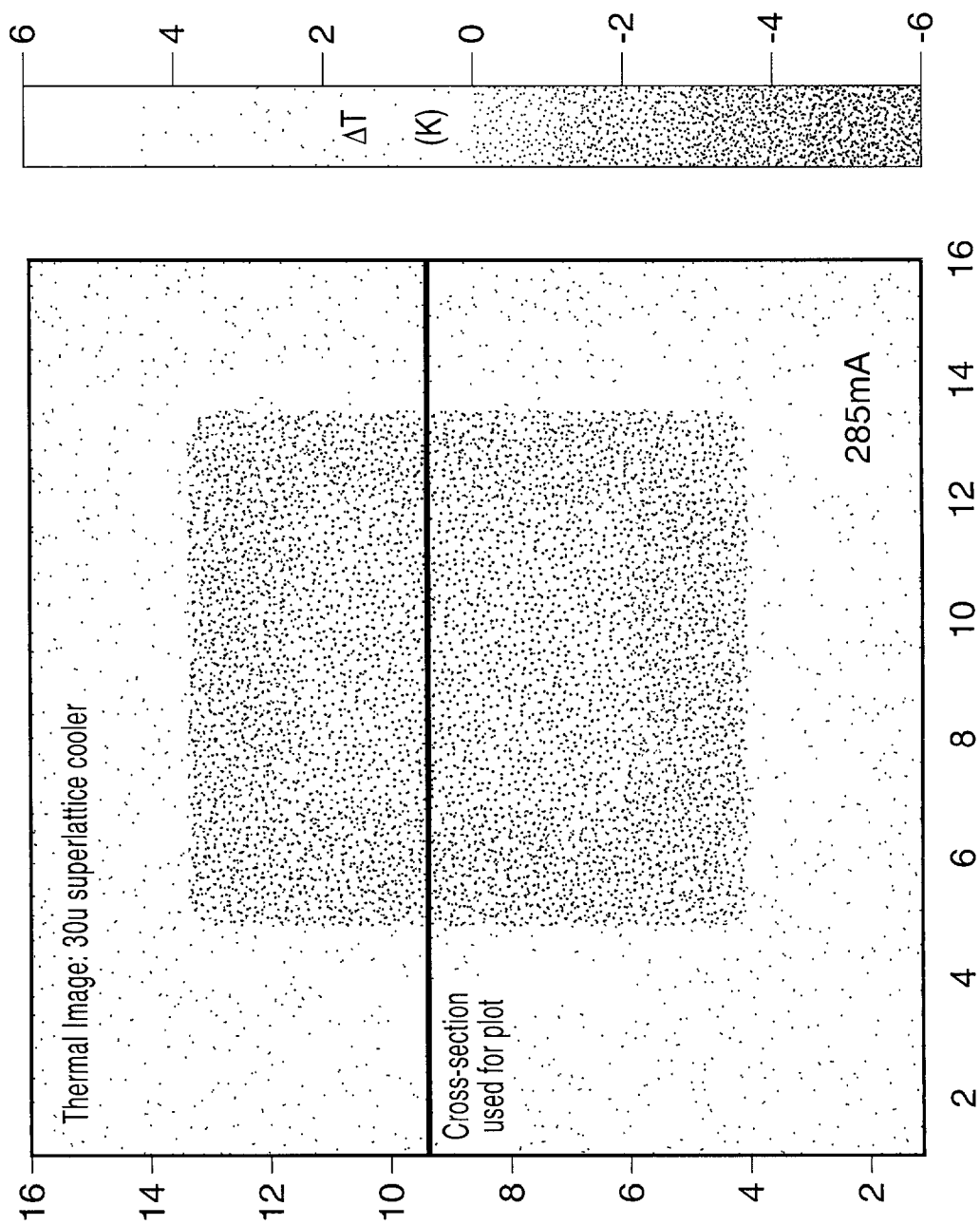
FIG. 11 is an image of the 30 µm HIT device of FIG. 9 registered by thermoreflectance according to the present invention, shown at a high current of 285 mA wherein heating from the contact layer dominates the image.
Figure 12:
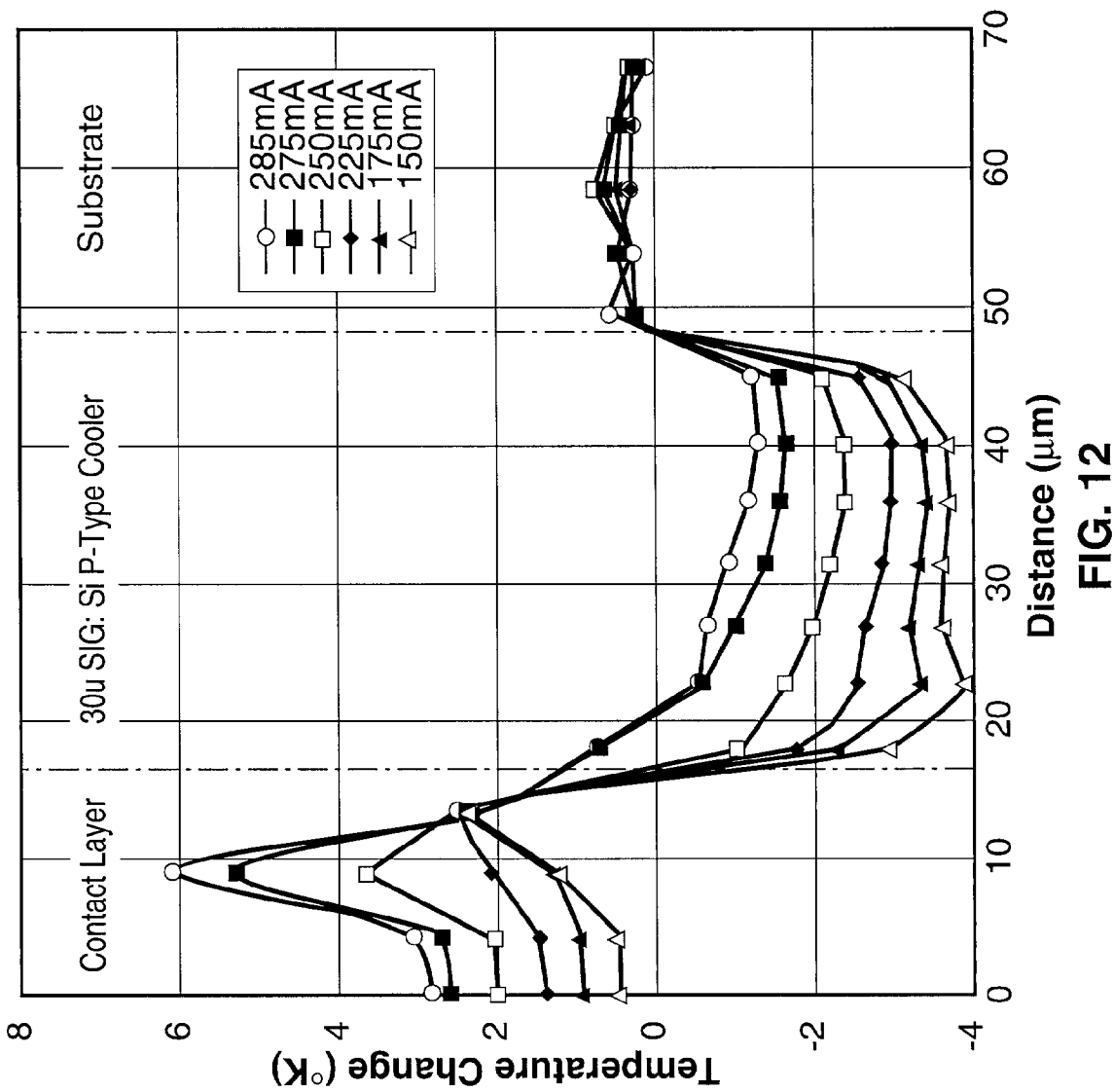
FIG. 12 is a graph showing HIT device cooling for various levels of applied current as registered by the thermoreflectance method according to the present invention.
Figure 13:
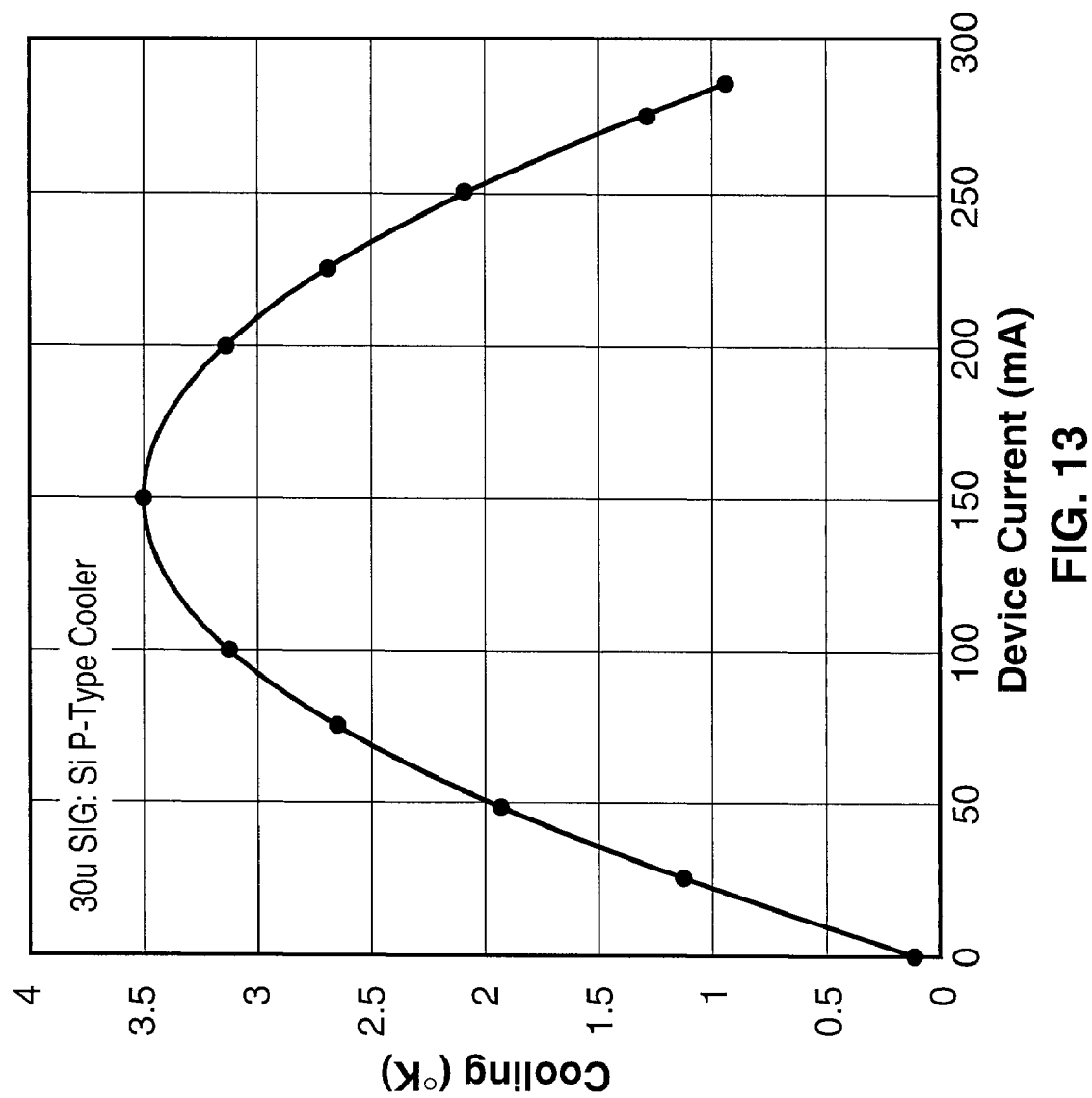
FIG. 13 is a graph showing average surface cooling for the HIT device in response to applied current.

Thermal images were acquired for different size devices at different currents and analyzed. A 30 µm HIT device is represented by FIG. 9 and an associated thermoreflective image is represented in FIG. 10 close to peak cooling at 150 mA. As the applied cooling current is increased, the heating from the contact layer starts to dominate the image and is represented in FIG. 11. A cross sectional plot is shown for different device currents within FIG. 12, which identifies a large heating load on the device at the junction between the contact layer and the cooler. Finally, the average cooling on the surface is shown in FIG. 13. It should be appreciated that the small device geometry was too small to be measured with the thermocouples.

6.4 Cooling Results on Different Sized Devices.

Figure 14:
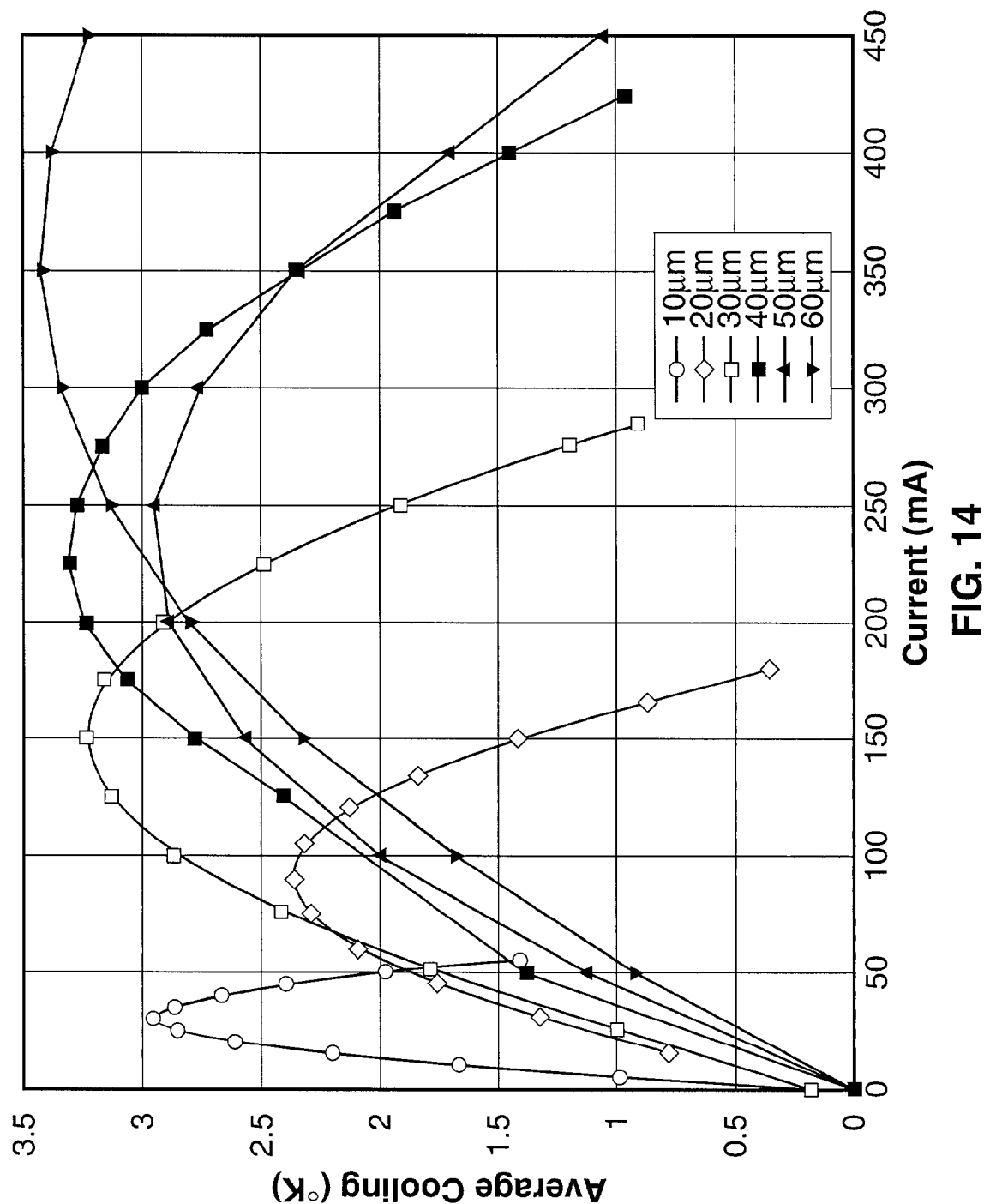
FIG. 14 is a graph showing average cooling for different sized HIT devices in response to applied current, shown registered by the thermoreflectance method of the present invention.

Cooling data processed for devices from 10 µm to 60 µm is presented in FIG. 14. It should be appreciated that conventional thermocouple measurements could not be performed on devices smaller than 40 µm. Finally, the use of the thermoreflectance imaging method of the present invention need not be limited to HIT coolers.

7. Detection of AC Reflection.

A number of techniques may be utilized for AC coupled registration of the reflectance in response to the thermal excitation of the sample such as the use of lock-in amplifiers, differential boxcar averaging, and FFT.

Figure 15:
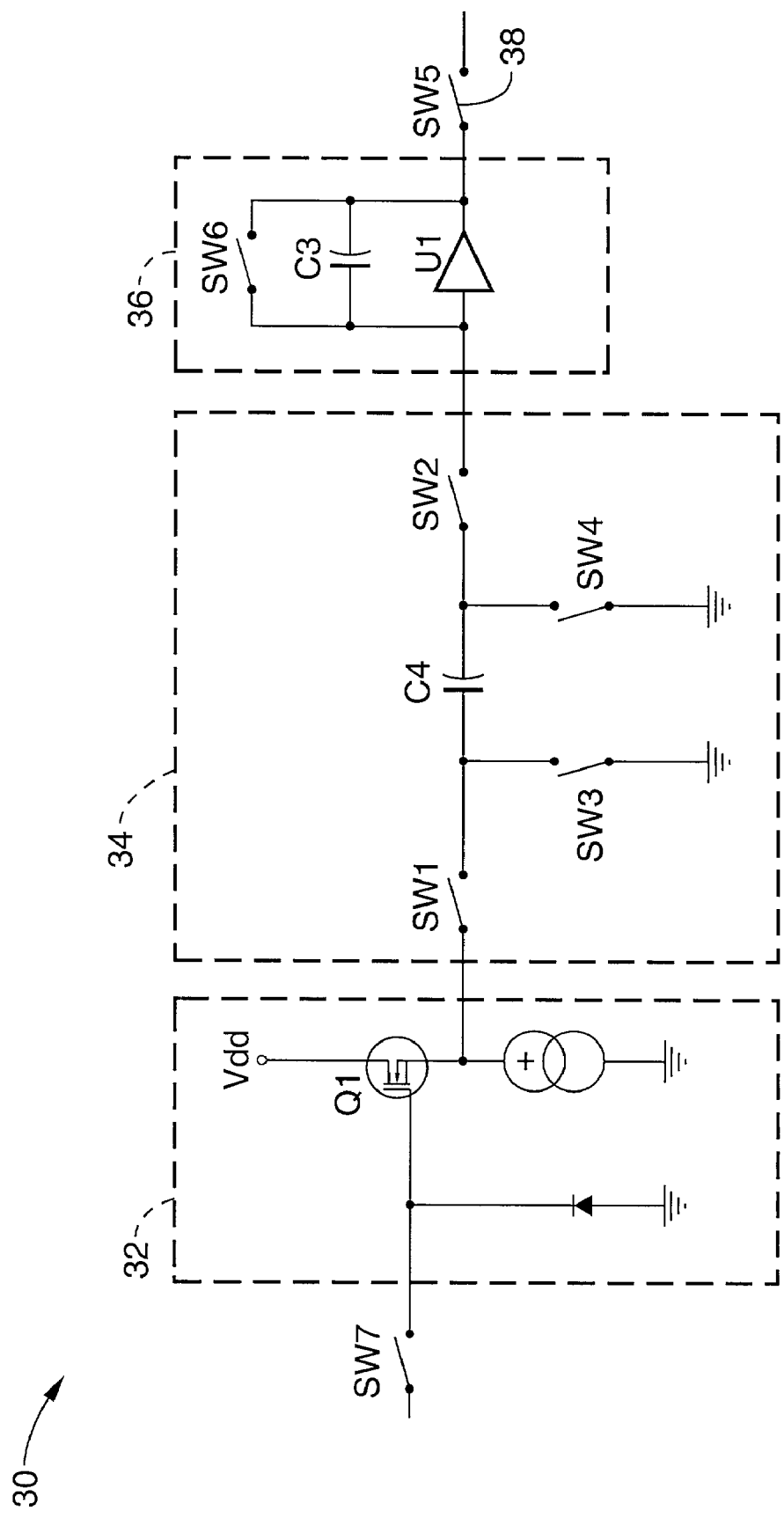
FIG. 15 is a schematic of a differential boxcar circuit for detecting small differences between two large signals such utilized within an embodiment of the present invention.

FIG. 15 depicts an example of a differential boxcar averaging circuit 30 which may be utilized within the present invention to extract the a repetitive thermoreflectance signal from background noise. A detector, or an element of a detector array, (not shown), such as incorporating one or more photodiodes, generates a signal in response to the photoreflectance. The signal is coupled to a buffer 32, which is exemplified as a FET-source follower circuit, and then applied to a correlated clamp circuit 34, such as that exemplified by the four switches (SW1, SW2, SW3, SW4) and capacitor C4. A difference signal is then received by an integration amplifier 36 whose output may be read out through a switch 38. Within the clamp circuit 34, the reflectance signal is sampled with switches SW1 and SW4 closed and SW2 and SW3 opened during one phase of the thermal modulation. After the sample temperature is changed, the signal is again applied to the correlated clamp, but this time switches SW1 and SW2 are closed while SW3 and SW4 are open. The resulting difference signal is integrated and stored on capacitor C3. It will be appreciated that the cycling must occur at a sufficient frequency so that the photocurrent in either phase does not saturate the input detector (photodiode). Similarly, the signal accumulated on capacitor C3 must be readout before the dynamic range of the integrator is exceeded, and typically will determine the readout frequency. This approach provides for the averaging of many samples in the detection circuit which can significantly reduce the required readout frequency while increasing the obtainable signal-to-noise ratio. The output may be read out directly or the signals from many such read cycles may be summed together off-chip, such as by utilizing digital signal processing techniques to achieve further SNR improvements and thermal sensitivity.

An additional benefit of the differential boxcar averaging circuit, besides the advantage of being able to integrate many imaging pixels monolithically, is that the time resolved transients may be easily detected. This is accomplished by sampling over small intervals and shifting the sampling time of one of the sampling phases relative to the reference sample through the signal obtained during the thermal transient. While the small sampling gate allows temporal resolution of the thermal transient, the total time required to acquire a signal with a given SNR would be increased if no adjustment is made on the intensity of the light source generating the reflectance signal.

The differential boxcar averaging circuit should be configured so that the circuit response within the individual intervals is minimized. The circuit shown utilizes the identical signal paths and components along the modulated signal path. The choice of switching elements should be carefully considered so as to reduce signal level dependencies which may arise from charge injection, such as within CMOS analog switches.

The ability to detect temporally resolved differences in small incoming signals can be extended to other applications in which the properties of the scene being imaged can be synchronously modulated with the sampling clock phases of the imager. An example of this may include the use of active laser illumination of the scene during one sampling phase to detect trace gases. The scene could be imaged through a narrow band optical filter tuned to a molecular transition which is excited or modulated by the remote laser. Another would be the synchronization of the sampling gate clocks with a mechanical modulation of the scene for vibrometry. In particular, a vibration source, "shaker", may be coupled to a structure to allow the vibration modes and responses to be directly imaged. Utilization of infrasonic signal sources may allow extension of this technique for use in remote applications in which access to the object under study is problematic.

8. Conclusion

A thermoreflectance imaging method was described which provides high spatial resolution and 0.1 degree thermal resolution. The method was described for use in characterizing microcoolers, although it may be applied to any device for which high thermal and spatial resolution are necessary. The described embodiments included progressions from point measurements to a laser scan, and finally to a thermal image acquired in "real-time" utilizing an imaging array, such as a PIN detector array sensor. Several images are presented that have better spatial resolution than can be obtained using any existing blackbody infrared camera. Furthermore a method is described for increasing the spatial resolution of the thermoreflective method through a superresolution technique, which combines sub pixel offset images to increase resolution. A drawback with thermoreflectance imaging is current uncertainty of the thermoreflectance constants of different materials, and is a comparable difficulty to the calibration problems that exist with using infrared camera systems.

Excellent results were achieved herein using an existing camera system, namely the SRI camera. Further optimization of the sensor, optics and signal processing can further increase the utility of the described thermal microscope. It is anticipated that spatial resolution below one micron and temperature sensitivity on the order of $10°$ mK should be achievable. Thermal characterization on the scale of modern electronic devices is important now and in the future and performing measurements on this scale has traditionally been difficult and subject to low resolution and accuracy.

Accordingly, it will be seen that this invention provides a non-contact technique for obtaining thermal information from a sample. The technique captures AC coupled thermoreflectance image data that is converted to thermal profiles and images, and can be utilized with fast acquisition systems to provide images in "real time" which make the method suitable for use as a thermal microscope. Furthermore, the basic resolution of the technique can be enhanced using a superresolution method which combines multiple pixel-offset images to increase the resolution of the resultant images. It will be appreciated that the described method can be implemented in a point mode, scanning mode, two-dimensional image capture mode, and combination thereof without departing from the teachings of the present invention. It will further be appreciated that the method may be utilized in a variety of application for resolving temperature profiles on any small cooling devices, electronic devices, MEMs devices, and other small geometry elements that are otherwise difficult to profile with existing techniques.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Methods of High Resolution Temperature Measurement

| Method | Principle | Resolution |
| --- | --- | --- |
| Liquid Crystal Thermography (LCT) | Crystal phase transitions | 2 μm, 500 mK ° |
| Fluorescence Thermography | Temperature dependence of quantum efficiency | 0.3 μm, 10 mK ° |
| Optical Interferometry | Thermal expansion | 1 μm |
| Polarization Difference Reflectance (PDR) | Reflection difference of P and S components | 30 μm, 500 mK ° |
| Near Field Probe (NSOM) | Use the near field | 50 nm–100 nm, depends |
| Infrared Thermography | Blackbody spectrum | 3 μm, <1000 mK ° |
| Thermoreflectance | Temperature dependence of reflectance | <1 μm, 1 mK ° |

What is claimed is:

1. An apparatus for providing non-contact thermal measurements of an active electronic device at high spatial and thermal resolutions, comprising:

an illumination source;

means for generating an electrical signal in response to registration of the magnitude of light received from said illumination source that is reflected from the surface of an active electronic device;

said means for generating an electrical signal comprises an illumination detector;

means for subjecting said active electronic device to modulated thermal excitation in response to changes in operating current or device state of said active electronic device; and means for generating a bandwidth-limited AC-component of the signal from said illumination detector in response to changes in thermoreflectivity from a surface of said active electronic device arising while said active electronic device is subjected to said modulated thermal excitation.

2. An apparatus for providing non-contact thermal measurements of active electronic devices at high spatial and thermal resolutions, comprising:

an illumination source;

an array of individual illumination detectors;

said illumination detectors configured to generate signals in response to registration of the magnitude of light received from said illumination source that is reflected from the surface of an active electronic device;

a circuit for modulating the thermal excitation of said active electronic device at a known frequency in response to changes in operating current or device state; and a signal processor;

said signal processor configured to filter one or more direct current components from said signal while said active electronic device is subjected to modulated thermal excitation to discern a thermoreflectance signal associated with said known frequency, from noise.

3. An apparatus as recited in claim 1, wherein said means for generating a signal in response to registration of the magnitude of light, comprises:

an array of individual illumination detectors.

4. An apparatus as recited in claim 3, wherein:

said array of illumination detectors is adapted to generate information on the intensity of light received by each of said individual illumination detectors in the array.

5. An apparatus as recited in claim 2 or 3, wherein said array of illumination detectors comprises an array of photodetectors ranging in size from approximately 16×16 array to approximately 64×64.

6. An apparatus as recited in claim 2 or 3, wherein said array of illumination detectors comprises an array of photodetectors ranging in size from approximately 2×2 to approximately 256×256.

7. An apparatus as recited in claim 1 or 2, further comprising:

a display;

said display adapted for displaying a bandwidth-limited AC-component of the signal.

8. An apparatus as recited in claim 1 or 2, further comprising:

means for receiving a bandwidth-limited AC-component of the signal associated with a known frequency of said modulated thermal excitation and computing a thermal measurement based on a change in registered surface reflectance.

9. An apparatus as recited in claim 8:

wherein said active electronic device has a known thermoreflectance constant; and wherein said change in registered surface reflectance is in response to a change in the thermoreflectance coefficient of the surface material of said active electronic device resulting from a temperature change associated with said thermal excitation.

10. An apparatus as recited in claim 1 or 2, further comprising:

means for generating a superresolution image from a combination of thermal images having a lower spatial resolution.

11. An apparatus as recited in claim 10, wherein said means for generating a superresolution image comprises:

a computer; and programming associated with said computer for, receiving a plurality of thermal images having a first image resolution, and combining said thermal images having said first resolution by interpolating pixel values into a thermal image having a higher second resolution.

12. An apparatus as recited in claim 1 or 2, wherein said illumination source comprises a laser light source.

13. An apparatus as recited in claim 12, wherein said laser light source operates at wavelength ranging from approximately 500 nm to approximately 800 nm.

14. An apparatus as recited in claim 12, wherein said laser light source has a wavelength of approximately 655 nm.

15. An apparatus as recited in claim 12, wherein said laser light source has an output power ranging from approximately 1 mW to approximately 100 mW.

16. An apparatus as recited in claim 12, wherein said laser light source has an output power of approximately 5 mW.

17. An apparatus as recited in claim 1 or 2, further comprising:

an x-y translation stage;

said translation stage configured to provide motion to said illumination source and said illumination detector in relation to the surface of said active electronic device;

wherein a thermal image may be constructed from data collected during scanning of the surface of said active electronic device.

18. An apparatus as recited in claim 17:
wherein said x-y translation stage comprises a piezoelectric translation stage;
wherein said translation stage provides movement resolution that is approximately equal to or higher than the desired spatial resolution at which the active electronic device is being measured.

19. An apparatus as recited in claim 1 or 2:
wherein said illumination source is configured to generate a beam spot size that approximates, or is less than, the desired spatial resolution of thermal measurement.

20. An apparatus as recited in claim 19, further comprising:
an inverse-filter which is applied to remove image blurring caused by an excessively large illumination spot size.

21. An apparatus as recited in claim 1 or 2, wherein said illumination detector comprises a photodiode.

22. An apparatus as recited in claim 1 or 2, wherein the frequency range of said modulated thermal excitation to which said active electronic device is subjected ranges from approximately 0.1 Hz to approximately 100 kHz.

23. An apparatus as recited in claim 1, wherein said means for generating a bandwidth-limited AC-component of the signal from said illumination detector while said active electronic device is subjected to modulated thermal excitation comprises:
a signal processor;
said signal processor configured to filter one or more direct current components from said signal to discern a thermoreflectance signal from noise;
said filter adapted with a passband associated with said thermal excitation.

24. An apparatus as recited in claim 2 or 23, wherein said signal processor is selected from the group of narrow band filters consisting essentially of a lock-in amplifier, differential boxcar averaging circuit, and FET analyzer.

25. An apparatus as recited in claim 2 or 23, wherein said signal processor is configured to filter out components of the signal other than a single harmonic of the registered illumination level.

26. A method as recited in claim 25:
wherein said single harmonic that is at, or associated with, the frequency of thermal modulation to which said active electronic device is subjected.

27. An apparatus as recited in claim 2 or 23, wherein said signal processor is configured to pass a band of frequencies that is less than approximately 10 Hz.

28. An apparatus as recited in claim 2 or 23, wherein signal processor has a passband having a maximum width of approximately 1 Hz.

29. An apparatus as recited in claim 2 or 23, wherein said signal processor is configured to pass a band of frequencies that is limited to approximately 0.1 Hz.

30. An apparatus as recited in claim 1 or 2, further comprising:
an imaging device adapted to receive a portion of the reflected illumination for aligning position of the illumination source in relation to the active electronic device.

31. An apparatus as recited in claim 30, further comprising:
a splitter configured to direct portions of said reflected illumination to said imaging device.

32. An apparatus as recited in claim 1, wherein said means for generating bandwidth-limited AC-component of the signal is configured for recovering amplitude and phase information.

33. An apparatus as recited in claim 32, wherein said amplitude and phase information are represented in an image of non-contact thermal measurement.

34. An apparatus as recited in claim 2, wherein said signal processor is further configured for recovering amplitude and phase information from said signal.

35. An apparatus as recited in claim 34, further comprising a display adapted to represent said amplitude and phase information.

36. A method for providing high resolution thermal imaging of an active electronic device, comprising:
modulating the device state or operating current of an active electronic device within a selected frequency range;
illuminating an area on the surface of an active electronic device for which thermal information is desired;
detecting illumination reflected from said area; and
generating an AC-coupled bandwidth-limited signal in response to detected illumination associated with the selected frequency of thermal modulation and thermoreflectivity changes of said active electronic device.

37. A method as recited in claim 36:
wherein said AC-coupled signal has a bandwidth with a center at, or associated with, the frequency of modulation of the device state or operating current to which said active electronic device is subjected as a source of thermal excitation.

38. A method as recited in claim 36, further comprising:
resolving the AC-coupled signal into an image.

39. A method as recited in claim 36, further comprising recovering amplitude and phase information from said AC-coupled bandwidth limited signal.

40. A method as recited in claim 39, further representing amplitude and phase information as a thermal image output.

41. A method for providing high resolution thermal imaging of an active electronic device, comprising:
modulating the device state or operating current of an active electronic device according to a selected frequency to produce thermal modulation;
illuminating an area on the surface of an object for which thermal information is desired;
detecting illumination reflected from said area in response to changes in thermoreflectance of the surface as subjected to thermal modulation;
generating an AC-coupled bandwidth-limited signal in response to detected illumination and in response to modulation at said selected frequency; and
resolving the AC-coupled signal into an image.

42. A method as recited in claim 41:
wherein said AC-coupled signal has a bandwidth with a center at, or associated with, the frequency of thermal modulation to which said active electronic circuit is subjected.

43. A method as recited in claim 41, further comprising recovering amplitude and phase information from said AC-coupled bandwidth limited signal.

44. A method as recited in claim 43, further representing amplitude and phase information as a thermal image output.

45. An apparatus for providing non-contact thermal measurements of an active electronic device at high spatial and thermal resolutions, comprising:
an illumination source;
an array of individual illumination detectors configured for generating an electrical signal in response to registration of the magnitude of light received from said illumination source that is reflected from the surface of an active electronic device; and
an electronic circuit configured for generating a bandwidth-limited AC-component of the electrical signal from said array of illumination detectors in response to changes in thermoreflectivity from a surface of said active electronic device arising in response to modulation of the operating current or device state changes of said active electronic device which results in modulated thermal excitation.

46. A method for providing high resolution thermal imaging of an active electronic device, comprising:
modulating the device state or operating current of an active electronic device within a selected frequency range;
illuminating an area on the surface of an active electronic device for which thermal information is desired;
detecting illumination reflected from said area within a detector or imaging array, wherein the illumination is detected over the area at a specific time without the necessity of scanning the illumination and detectors over the surface of said area;
generating an AC-coupled bandwidth-limited signal in response to amplitude and phase information recovered from said AC-coupled bandwidth limited signal associated with the selected frequency of thermal modulation and thermoreflectivity changes of said active electronic device; and
representing amplitude and phase information as a thermal image output.

47. A method as recited in claim 46, further comprising increasing the resolution of said thermal image output to a second resolution in response to superresolution methods performed on a set of images at a first resolution, wherein said second resolution is higher than said first resolution.

* * * * *